(12) United States Patent
Meinen

(10) Patent No.: US 12,546,293 B2
(45) Date of Patent: Feb. 10, 2026

(54) METHOD FOR HOLDING A CABLE FOR A WIND TURBINE

(71) Applicant: VOS PRODECT INNOVATIONS B.V., Klazienaveen (NL)

(72) Inventor: Warner Meinen, Klazienaveen (NL)

(73) Assignee: VOS PRODECT INNOVATIONS B. V., Al Klazienaveen (NL)

( * ) Notice: Subject to any disclaimer, the term of this patent is extended or adjusted under 35 U.S.C. 154(b) by 719 days.

(21) Appl. No.: 17/908,071

(22) PCT Filed: Mar. 11, 2021

(86) PCT No.: PCT/EP2021/056157
§ 371 (c)(1),
(2) Date: Aug. 30, 2022

(87) PCT Pub. No.: WO2021/180835
PCT Pub. Date: Sep. 16, 2021

(65) Prior Publication Data
US 2023/0110151 A1 Apr. 13, 2023

(30) Foreign Application Priority Data

Mar. 12, 2020 (NL) ...................................... 2025114

(51) Int. Cl.
*F03D 80/80* (2016.01)
*H02G 1/08* (2006.01)
(Continued)

(52) U.S. Cl.
CPC ................ *F03D 80/85* (2016.05); *H02G 1/08* (2013.01); *H02G 3/0481* (2013.01); *H02G 15/013* (2013.01)

(58) Field of Classification Search
CPC .......... H02G 1/08; H02G 1/10; H02G 15/013; H02G 3/0481; H02G 9/12; F03D 13/20
See application file for complete search history.

(56) References Cited

U.S. PATENT DOCUMENTS

2023/0110151 A1* 4/2023 Meinen .................... H02G 9/12
174/79

FOREIGN PATENT DOCUMENTS

| DE | 102011109328 B3 * | 12/2012 | ............. H02G 15/06 |
| EP | 3 453 087 A1 | 3/2019 | |

(Continued)

OTHER PUBLICATIONS

Dutch Search Report, issued in Priority Application No. 2025114, dated Dec. 16, 2020.

(Continued)

*Primary Examiner* — Minh N Trinh
(74) *Attorney, Agent, or Firm* — Birch, Stewart, Kolasch & Birch, LLP

(57) ABSTRACT

A method for holding a cable in a wind turbine transition piece by a cable hang-off device, the method includes providing a cable hang-off device comprising a main body with a first flange, an opposed second flange and a through passage, a sealing sleeve with a sealing passage, at least one temporary clamp, located in the through passage, a clamping plate, and at least one solid sealing element, attaching the main body to the wind turbine transition piece with the first flange, attaching the sealing sleeve to the second flange, inserting the cable through the through passage and the sealing passage sleeve, clamping an outer serving of the cable with the at least one temporary clamp, pealing the outer serving of the cable to reveal armour wires of the cable, folding the armour wires over the second flange in a radially outward direction, with respect to a longitudinal direction of the cable hang-off device, inserting the clamping plate in the sealing passage, clamping the armour wires against the second flange, by the clamping plate, releasing the at least one temporary clamp from outside the main body to release a clamping force from the at least one temporary (Continued)

clamp, inserting the at least one solid sealing element in the sealing passage to at least partially surround one or more conductors of the cable, and sealing the sealing passage with the at least one solid sealing element.

14 Claims, 12 Drawing Sheets

(51) Int. Cl.
*H02G 3/04* (2006.01)
*H02G 15/013* (2006.01)

(56) References Cited

FOREIGN PATENT DOCUMENTS

| GB | 2560798 A | 9/2018 |
|----|-----------|--------|
| KR | 10-1467113 B1 | 12/2014 |
| WO | WO 2017/191474 A1 | 11/2017 |
| WO | WO 2018/073580 A1 | 4/2018 |
| WO | WO 2019/184101 A1 | 10/2019 |

OTHER PUBLICATIONS

International Search Report, issued in PCT/EP2021/056157, dated Jun. 4, 2021.
Written Opinion of the International Searching Authority, issued in PCT/EP2021/056157, dated Jun. 4, 2021.

* cited by examiner

METHOD FOR HOLDING A CABLE FOR A WIND TURBINE

CROSS-REFERENCE TO RELATED APPLICATIONS

This application is the National Phase of PCT International Application No. PCT/EP2021/056157, filed on Mar. 11, 2021, which is hereby expressly incorporated by reference into the present application.

BACKGROUND

Field

The present invention relates to cable hang-off device for holding a cable in a wind turbine transition piece. The present invention further relates to a sealing assembly for a cable hang-off device and to a method for holding a cable in a wind turbine transition piece.

Description of the Related Art

Offshore wind turbines need to be connected to the electrical grid for discharging the electricity that is generated with the turbine. Electricity cables thereto lay on the seabed and enter the interior of the wind turbine in a bottom region of their foundation. Offshore wind turbines are generally installed on a transition piece that forms a transition between the turbine's foundation, such as a monopole, and the turbine's mast. The cable towards the turbine is generally suspended in the transition piece by means of a hang-off device.

A wind turbine transition piece comprises a horizontal separation wall that separates a bottom part, which is in contact with the interior of the monopole and the seawater therein, from a top part that connects to an interior of the turbine's mast and the gondola of the turbine. This separation is essential to prevent dangerous gasses, such as hydrogen originating from corrosion of the monopole in the seawater, from passing towards the mast and the gondola of the turbine, since those need to be accessed by people for maintenance and repair.

The cable needs to pass through this separation wall to extend from the seabed to the gondola. This passage forms a weak spot in preventing the dangerous gasses from passing through. To contribute in sealing the top part from the bottom part, cable hang-off devices are provided to form a seal against conductors of the cable.

These known cable hang-off devices generally rely on resin to form a proper seal around the cable conductors. This implies that the various components of the hang-off device are installed into place, after which a remaining cavity within a circumferential sealing wall is filled with resin. After curing, the resin will form an airtight seal for preventing the passage of dangerous gasses.

The known hang-off devices have the drawback that the resin takes time to cure. During this curing time, it is not possible to further work on the hang-off device, as it might influence the hardening of the resin. Once hardened, on the other hand, the resin becomes tightly attached to the cable conductors and the hang-off device, making it hard to access inner parts of the hang-off device for service or maintenance, since those parts are embedded in resin. Furthermore, the used resin has an unfavourable behaviour at the temperatures that typically occur in such transition pieces and the resin may expire, which causes the sealing properties to deteriorate over time. Furthermore, the resin needs to be brought into narrow spaces within the transition piece, since it cannot be installed onshore. Finally, the use of resin also provides for dangerous fumes in the turbine's compartments where the people are present for installing the hang-off device.

SUMMARY

It is an object of the present invention to provide a cable hang-off device that lacks one or more of the above-mentioned drawbacks, or at least to provide an alternative cable hang-off device.

The present invention provides a cable hang-off device for holding a cable in a wind turbine transition piece including a main body, which comprises a first flange, an opposed second flange and a through passage that extends between the first flange and the second flange and in a longitudinal direction of the hang-off device, wherein the first flange is configured to be attached to the transition piece and wherein the through passage is configured to allow insertion of a cable, at least one temporary clamp, which is located in the through passage and which is configured to clamp an outer serving of the cable to temporarily hold the cable in place within the main body, a clamping plate, which is configured to be attached to the second flange and which is configured to clamp armour wires of the cable against the second flange to hold the cable in place within the main body, a sealing sleeve, which is attached to the second flange and which comprises a cylindrical wall that defines a sealing passage for one or more conductors of the cable, and at least one solid sealing element, which is configured to be installed within the sealing passage in order to at least partially surround the one or more cable conductors to seal the sealing passage.

With the hang-off device according to the present invention, it is no longer necessary to use resin for forming a seal in the hang-off device, e.g. around the cable conductors. Instead, the cable hang-off device according to the present invention comprises at least one solid sealing element that is installed to form a seal for preventing dangerous gasses from passing from the bottom part of the transition piece towards the top part.

The main body of the hang-off device may be embodied as a tubular element that extends in a direction that forms the longitudinal direction of the hang-off device. In an installed configuration of the hang-off device, this longitudinal direction is generally aligned parallel to the vertical direction, in an installed configuration of the hang-off device.

The main body comprises a through passage that is aligned parallel to the longitudinal direction and that extends between a first end and a second end. At the first end, a first flange is provided, which extends in a plane perpendicular to the longitudinal direction, for example being the horizontal plane. The first flange may be an inner flange, e.g. within the through passage, or an outer flange, e.g. arranged outside the through passage, or may be a combination of an inner flange and an outer flange. The first flange may be provided with one or more through holes in the longitudinal direction, which enable fastening of the first flange by means of a bolted or riveted connection.

Similarly, a second flange is provided at the second end, which also extends in a plane perpendicular to the longitudinal direction, e.g. in a plane parallel to the plane of the first flange. The second flange may be an inner flange, e.g. within the through passage, or an outer flange, e.g. arranged outside the through passage, or may be a combination of an inner flange and an outer flange. The second flange may be provided with one or more holes in the longitudinal direction, which enable fastening of the second flange by means of a bolted or riveted connection.

The main body of the hang-off device is configured to be attached to the transition piece with the first flange. The transition piece may thereto comprise a similar flange, such that both flanges may be brought together in a mating configuration for being for example connected to each other by means of bolts or rivets. Alternatively or additionally, the first flange of the main body may be integrally connected to the transition piece, for example by means of a welded connection.

The hang-off device is adapted to be arranged in an interior of the transition piece, for example through the separation wall of the transition piece that separates the bottom part of the transition piece from the top part of the transition piece. The main body of the hang-off device may either be attached to the transition piece offshore, e.g. when the transition piece has been installed on a wind turbine foundation, such as a monopole, or may be attached onshore, for example during manufacturing of the transition piece. The latter, e.g. onshore, installation has the advantage that it is not required to manoeuvre the main body in the tight interior spaces of the transition piece, for example through manholes or the like, which is difficult due to the large weight of the main body and the poor accessibility for lifting tools. Instead, the main body can be easily installed during manufacturing in a workshop, when the interior space of the transition piece has not yet been fully closed.

After being attached to the transition piece, the through passage of the main body becomes aligned with a hole or passage through which the cable is guided into the interior of the transition piece. Accordingly, the cable can be inserted in the through passage of the main body, such that it may extend from the first end of the main body towards the second end of the main body and preferably extending even further upwards, e.g. towards the gondola of the turbine.

The hang-off device comprises at least one temporary clamp in the through passage of the main body. The temporary clamp is configured to temporarily clamp the cable, in particular the outer serving of the cable, e.g. the insulation shielding or jacket. By means of the clamping, the cable can be held in place in the hang-off device in a temporary way.

This temporary hanging is beneficial since the clamping of cables, in particular of the high-voltage cables that can be found in wind turbines, can result in irregularities in the conductors of the cable. Such irregularities may give rise to local reductions in cross-sectional area of the conductors and therefore to localized increases in current density and corresponding increases in resistive heating. When the cable were to be damaged with irregularities too much, the entire cable would be rejected and a new cable would have to be provided, which is rather expensive and also causes significant downtime, thus becoming even more expensive.

Because the hang-off device only clamps the cable temporarily, the required clamping force may be lower, since the clamping not needs to be safeguarded for decades. Hence, the cable is held permanently in a different way, as is described below. The lower clamping forces reduce the risk of having irregularities in the cable and thereby ensure that the cable does not need to be replaced early.

The at least one temporary clamp may, for example, comprise a plurality of temporary clamps that are spread over the circumference of the through passage. The temporary clamps may be located in between the main body and the cable that extends through the through passage in the main body and may be spaced at even distances from each other, when seen in a tangential direction around the longitudinal direction.

Existing hang-off devices were generally not suitable to be assembled onshore, because their split design offered too little space to insert the cable after assembly. Instead, the present invention provides a spacing inside the main body, e.g. between the temporary clamps, which enables the cable to be inserted conveniently after assembly of the main body.

The cable may be clamped by applying a clamping force between the main body and each of the respective temporary clamps, such that the clamps are each biased in a radially inward direction, when seen with respect to the longitudinal direction, e.g. in a direction towards the cable. The temporary clamps are thereby configured to apply normal forces on the cables in the respective radial direction, which, in turn, effect a combined frictional force that counteracts the gravitational forces on the cable. The temporary clamps may comprise corrugated surfaces for contacting the cable, for example being provided with a series of ridges, which increase the frictional coefficient. As such, the same cable can be held, e.g. effecting the same frictional force, while having smaller normal forces, thereby having a lower risk of having irregularities in the cable.

The at least one temporary clamp needs to be releasable, to provide that the clamping forces can be released once the cable is held permanently in the hang-off device. A clamp that cannot be released after complete installation of the hang-off device therefore fails to qualify as a temporary clamp, since the clamping force will then continue to act on the cable.

The releasable temporary clamp provides that the clamping forces can be released once the cable is held permanently in the hang-off device, by being suspended on its armour wires. With the at least one temporary clamp being released right after the cable has been held permanently, the risk of inducing irregularities in the cable conductors will be reduced significantly.

The hang-off device further comprises at least one tensioner, which is configured to temporarily exert the clamping force onto the at least one temporary clamp.

During installing of the hang-off device, the tensioner can therefore be operated from outside the main body to apply the clamping force, when a cable has just been guided through the through passage in the main body and also with the sealing sleeve attached to the main body. Furthermore, the tensioner can as well be operated from outside the main body to release the clamping force from the at least one temporary clamp, when the cable has been held permanently via its armour wires and also with the sealing sleeve attached to the main body.

In existing hang-off devices, the cable generally remained clamped, because the clamping mechanism would be concealed inside the main body of the device after assembly, thus not being accessible to be released. Compared to the known hang-off devices, the provision of the at least one tensioner enables the clamping force to be applied and to be released also when the hang-off device has been installed, namely from outside the main body. Accordingly, the deformations of the outside of the cable under the influence of the clamping forces is avoided and the pressure on the cable is reduced to zero after final installation.

A further benefit of the releasable temporary clamp according to the present invention is that the degree of clamping, i.e. the clamping force exerted on the outer serving of the cable, can be accurately adjusted upon adjusting the tensioner. It is typically desired to avoid permanent deformations of the cable, since such deformations might be dangerous for safe operation of the cable while guiding electric currents, e.g. during use. The present tensioner, preferably when embodied as a bolt, allows the clamping force to be set sufficiently high to temporarily clamp the cable reliably, whilst avoiding deformations.

The present releasable temporary clamp with the tensioner also has a benefit over existing hang-off devices in which the cable is suspended by an expandable polyurethane sealing element. First of all are such sealing elements completely located inside the main body, thus not being accessible after assembly of the hang-off device and not being releasable. Secondly, the maximum clamping force that can be exerted with such expandable sealing elements is fairly limited. Cables used in hang-off devices may have outer diameters of up to 120 mm and correspondingly have a large weight. The clamping forces from such expandable sealing elements are too low to reliably hold cables of such large diameters.

The sealing sleeve of the hang-off device is attached to the second flange of the main body and is, at least in an installed configuration of the hang-off device, arranged on top of the main body. The sealing sleeve comprises a cylindrical wall that extends around the longitudinal direction. The cylindrical wall defines a through sealing passage through the sealing sleeve, which forms a continuation of the through passage though the main body. The cable, and in particular the cable conductors, may thereby not only extend through the through passage in the main body, but also extends through the sealing passage in the sealing sleeve.

The sealing sleeve may comprise a sleeve flange at its lower end, with which it is configured to be attached to the second flange of the main body. The sleeve flange may be an inner flange, e.g. within the sealing passage, or an outer flange, e.g. arranged outside the cylindrical wall of the sealing sleeve, or may be a combination of an inner flange and an outer flange. The sealing flange may be provided with one or more through holes in the longitudinal direction, wherein a pattern of these one or more longitudinal through holes substantially correspond to a pattern of the one or more longitudinal holes in the second flange of the main body, in order enable fastening of the sealing sleeve onto the second flange by means of a bolted or riveted connection.

The clamping plate of the hang-off device is used to permanently hold the cable in the hang-off device. Thereto, the clamping plate is attached to the second flange of the main body, e.g. at the second, upper end of the main body. The clamping plate may be provided as a planar element, having a shape that substantially corresponds to the shape of the second flange.

The clamping plate may be configured to be attached to the second flange within the sealing passage that is defined by the cylindrical wall of the sealing sleeve. As such, the clamping plate may be shielded from the surroundings by the sealing elements that are configured to be arranged within the sealing sleeve.

The clamping plate may comprise a central through opening, through which at least conductors of the cable may extend further upward, e.g. towards the gondola of the wind turbine. Around the central through opening, the clamping plate may be provided with one or more through holes in the longitudinal direction, wherein a pattern of these one or more longitudinal through holes substantially correspond to a pattern of the one or more longitudinal holes in the second flange of the main body, in order enable fastening of the clamping plate onto the second flange by means of a bolted or riveted connection.

For permanently holding the cable in the hang-off device, the cable may be pealed at or near the location of the second flange of the main body, in order to reveal armour wires of the cable. These armour wires will then be bent radially outward, away from the longitudinal direction, and are arranged on top of the second flange of the main body. The clamping plate will then be arranged on top of the armour wires and on the second flange. Upon attaching the clamping plate to the second flange, for example by means of a bolted connection, the clamping plate and the second flange are pulled towards each other. Accordingly, a clamping force is exerted on the armour wires that are located in between the clamping plate and the second flange. The clamping force will effect a frictional force in an elongate direction of the armour wires, which will permanently hold the cable in place within the hang-off device.

Accordingly, the cable will become suspended on its armour wires in an installed configuration of the hang-off device. The tensioning of the armour wires will, opposed to the clamping of the cable's outer serving, not result in significant irregularities in the cable conductors. Furthermore, the at least one temporary clamp can be released right after the cable has been held permanently via its armour wires, which provides that the risk of inducing irregularities in the cable conductors can be removed right away.

Furthermore, the hang-off device according to the present invention comprises at least one solid sealing element, which is configured to be installed within the sealing passage. The at least one solid sealing element may be inserted into the sealing passage from above, e.g. from an upper head end opening in the cylindrical wall of the sealing sleeve. The at least one solid sealing element is configured to at least partially surround the one or more cable conductors in the sealing passage after being inserted therein.

The at least one solid sealing element may comprise multiple solid sealing elements, which may, in combination, be configured to form a transverse sealing wall in the sealing passage, which extends in a plane perpendicular to the longitudinal direction, e.g. in a horizontal plane.

The sealing wall that is formed by the combined solid sealing elements may have a shape that substantially corresponds to a cross-section of the cylindrical wall of the sealing sleeve. In particular, the perimeter of all combined solid sealing elements may substantially correspond to the perimeter of the cylindrical wall of the sealing sleeve, in order to form a substantially airtight seal between them.

The solid sealing elements may comprises a recess at their portions that are configured to about the cable conductors, wherein the recesses in the solid sealing elements substantially correspond to a cross-sectional shape of a cable conductor. As such, an airtight seal may be formed between the cable conductors and the solid sealing elements as well.

The number of sealing elements may correspond to the number of conductors in the cable. As such, each of the solid sealing elements may accommodate a single cable conductor in its respective recess or a respective cable conductor may be sealed in between each two adjacent solid sealing elements. In particular, the hang-off device may comprise three solid sealing elements for sealing against a cable that comprises three conductors.

The at least one solid sealing element may make the use of resin obsolete for forming a seal within the sealing passage. Hence, the solid sealing elements are free of fluid and do not involve curing times or the like. Instead, the sealing of the at least one solid sealing element may be safeguarded right after installation within the sealing sleeve.

As a result, the present hang-off device provides the advantage over the known hang-off devices in that it is no longer necessary to await curing before the hang-off device is completed and able to form a proper airtight seal, wherein this reduction in downtime reduces costs. The lack of resin may also provide that the sealing properties can be safeguarded over a longer period of time, since the solid sealing elements may not be prone to deterioration.

Furthermore, the solid sealing elements are easier to handle within the transition piece, making the installation more convenient. Similarly, the solid sealing elements can be easily removed from the sealing sleeve when service or maintenance is required in inners parts of the hang-off device, which forms a further advantage over the resin that hardens in the hang-off device. Finally, dangerous fumes in the turbine's compartments may no longer occur, since it is no longer essential to use resin for sealing the hang-off device, which means that the present hang-off device is also safer to install.

The at least one solid sealing element may also comprise a polyurethane material within the sealing sleeve. The polyurethane material may expand in the sealing sleeve, in order to form a polyurethane foam material within the sealing passage. The polyurethane foam material is configured to at least partially surround the one or more cable conductors in the sealing passage and may thereby be configured to form a transverse sealing wall in the sealing passage, which extends in a plane perpendicular to the longitudinal direction, e.g. in a horizontal plane.

The sealing wall that is formed by polyurethane foam material may have a shape that substantially corresponds to a cross-section of the cylindrical wall of the sealing sleeve. In particular, the perimeter of the polyurethane foam material may substantially correspond to the perimeter of the cylindrical wall of the sealing sleeve, in order to form a substantially airtight seal between them.

Accordingly, the sealing sleeve may be provided with a cover at its upper end, for example with a lid on top of the cylindrical wall of the sealing sleeve, in order to close off the polyurethane foam material in the sealing passage from the surroundings of the hang-off device.

The polyurethane foam material may be airtight, in order to prevent the passage of dangerous gasses next to the cable conductors. Furthermore, the polyurethane material is convenient to install, since its volumetric expansion may be large, thus only requiring a small amount of polyurethane material to be used for obtaining a large amount of polyurethane foam material. This reduced amount of non-foamed polyurethane material requires less handling and is therefore more user-friendly than the handling of the non-expanding resin that is used in the known prior art hang-off devices.

In an embodiment of the hang-off device, the main body is a single-piece main body. Such a single-piece main body is different from the know hang-off devices that are characterized by a split design. Such split designs generally comprise multiple parts that adjoin each other at a seam, generally being a vertical seam. Such a seam forms a discontinuity in the tubular main body and may require additional an additional seal, such as a gasket or the like, for preventing leakages. Nevertheless, the known split design was essential in the prior art hang-off device, because those had to be made in situ, e.g. offshore, after installation of the transition piece. Accordingly, the entire hang-off device needed to be assembled around the cable that was already guided into the interior of the transition piece.

Instead, the single-piece main body according to the present embodiment is free of parting seams and is therefore less prone to leakages. In particular, the single-piece main body may comprise a single tubular piece onto which flanges are attached by means of welded connections. As such, the entire main body may be an integral piece with fewer discontinuities than the split design that is known from prior art.

The single-piece main body may be particularly beneficial, since it enables onshore installation of the main body. This main body may be attached to the transition piece during manufacturing of the transition piece. The cable may be guided through the single-piece main body at a later point in time, e.g. after the transition piece has been installed on the turbine's foundation, whereas the prior art hang-off device had to be installed only after the cable had been guided into the transition piece.

This onshore installation has the advantage that it is not required to manoeuvre the main body in the tight interior spaces of the transition piece, for example through manholes or the like, which is difficult due to the large weight of the main body and the poor accessibility for lifting tools. Instead, the single-piece main body can be easily installed during manufacturing in a workshop, when the interior space of the transition piece has not yet been fully closed.

In an alternative or additional embodiment of the hang-off device, the sealing sleeve is a single-piece sealing sleeve. Similar as described above for the single-piece main body, is the single-piece sealing sleeve according to the present embodiment also free of parting seams and therefore less prone to leakages. In particular, the single-piece sealing sleeve may consist of a single tubular piece onto which a flange is attached by means of a welded connection. As such, the entire sealing sleeve may be an integral piece with fewer discontinuities than the split design that is known from prior art.

The single-piece sealing sleeve may be particularly beneficial, since it also enables onshore installation of the sealing sleeve. This sealing sleeve may already be attached to the main body, for example to a single-piece main body, during manufacturing of the transition piece. The cable may be guided through the single-piece main body and the single-piece sealing sleeve at a later point in time, e.g. after the transition piece has been installed on the turbine's foundation, whereas the prior art hang-off device had to be installed only after the cable had been guided into the transition piece This onshore installation has the advantage that it is not required to manoeuvre the sealing sleeve in the tight interior spaces of the transition piece, for example through manholes or the like, which is difficult due to the large weight of the sealing sleeve and the poor accessibility for lifting tools. Instead, the single-piece sealing sleeve can be easily installed during manufacturing in a workshop, when the interior space of the transition piece has not yet been fully closed.

In a further embodiment of the hang-off device, the single-piece sealing sleeve comprises a circumferential sealing flange that is connected to the cylindrical wall, for example at a lower end thereof. The single-piece sealing sleeve is configured to be attached to the second flange with the sealing flange.

The sealing flange may be an annular sealing flange that circumferentially extends as a single piece, without being separated by one or more parting seams. The sealing flange may be integrally connected to the cylindrical wall of the sealing sleeve, for example by means of a welded connection or being casted as a single piece.

The sleeve flange may be an inner flange, e.g. within the sealing passage, or an outer flange, e.g. arranged outside the cylindrical wall of the sealing sleeve, or may be a combination of an inner flange and an outer flange. The sealing flange may be provided with one or more through holes in the longitudinal direction, wherein these one or more longitudinal through holes substantially correspond to a pattern of the one or more longitudinal holes in the second flange of the main body, in order enable fastening of the sealing sleeve onto the second flange by means of a bolted or riveted connection.

In an embodiment, the sealing sleeve may be a single-piece sealing sleeve, as described above, and the hang-off device may further comprises a sealing element, e.g. a solid sealing element in the sealing passage that comprises a cured resin. This resin-based sealing element may only partly fill the sealing passage of the sealing sleeve to obtain the desired level of sealing Compared to the known hang-off devices, the single-piece sealing sleeve may only require a much smaller amount of resin to be used, since the sealing passage does not need to be filled entirely. Hence, the drawbacks of using resin are thereby minimized, when compared to the known hang-off devices that rely on relatively large amounts of resin to obtain a proper seal, e.g. without single piece sealing sleeves.

For installing this hang-off device, a small amount of two-component resin may be supplied in a mixing bag that initially comprises two separate compartments, wherein each of the resin's components is packaged in a separate compartment. A separation wall between the compartments of the mixing bag may be broken, in order to allow both components to become mixed. After mixing, an opening may be made in the mixing bag, in order to fill the sealing passage in the single-piece sealing sleeve with the mixed two-component resin.

The use of this mixing bag is possible, since only a small amount of resin is required for use in the hang-off device with the single-piece sealing sleeve. The mixing bag thereby provides the advantage that the mixing can take place while the resin in the mixing bag is closed-off from the surroundings, and thus closed-off from personnel that is installing the hang-off device. Accordingly, the release of dangerous fumes is minimized and the curing time is also relatively short, due to the relatively small amount of resin that is used.

The two-component resin may, for example, comprise a curable two-component polyurethane resin material.

In an embodiment of the hang-off device, an inner diameter of the sealing passage is larger than the outer diameter of the clamping plate. The clamping plate is thereby more narrow than the cylindrical wall of the sealing sleeve and is therefore capable of being inserted into the sealing passage. For example, the clamping plate may be inserted into the sealing passage from above, e.g. from an upper head end opening in the cylindrical wall of the sealing sleeve.

In a further embodiment, an inner diameter of the circumferential sealing flange is larger than the outer diameter of the clamping plate. According to this embodiment, the clamping plate can not only be inserted into the sealing passage of the sealing sleeve, but may also be lowered to fit within the sealing flange of the sealing sleeve, e.g. at the lower end of the sealing sleeve.

According to this embodiment, the sealing flange and the clamping plate may both be arranged directly onto the second flange of the main body. This second flange is accordingly both in contact with the sealing flange and with the clamping plate.

The second flange may thereto have a width in the radial direction, seen with respect to the longitudinal direction, that corresponds to the combined widths of both the sealing flange and the clamping plate.

Furthermore, the second flange of the main body may be provided with a first set of through holes in the longitudinal direction, wherein a pattern of this first set of longitudinal through holes substantially correspond to a pattern of the one or more longitudinal through holes in the sealing flange of the sealing sleeve. The second flange of the main body may further be provided with a second set of holes in the longitudinal direction, for example non-through holes, e.g. blind holes, wherein a pattern of this second set of longitudinal holes substantially correspond to a pattern of the one or more longitudinal through holes in the clamping plate. As such, both the sealing sleeve and the clamping plate may be simultaneously fastened to the second flange by means of a bolted or riveted connection.

Alternatively, the outer diameter of the clamping plate may be larger than the inner diameter of the sealing passage in the sealing sleeve. For such a hang-off device, the clamping plate may be first attached on the second flange of the main body, thereby clamping the armour wires of the cable in between the clamping plate and the second flange. Thereafter, the sealing sleeve may be arranged on top of the clamping plate, after which the sealing sleeve is attached to the second flange.

In an embodiment of the hang-off device, the clamping plate comprises multiple clamping plate segments, which are each configured to be inserted in the sealing passage, to form the clamping plate within the sealing passage. The entire annular clamping plate is thereby composed of multiple clamping plate segments, which together form the entire clamping plate.

The provision of the multiple clamping plate segments may provide for more convenient insertion of the clamping plate into the sealing passage. The clamping plate segments are individually smaller than an entire clamping plate and are therefore more convenient to handle within the transition piece, reducing the human effort that is required for the installation of the hang-off device.

In an embodiment, the hang-off device further comprises a support plate that is, within the through passage, configured to rest on the first flange in order to form a support for the at least one temporary clamp. The support plate provides that the at least one temporary clamp does not need to rest directly on the first flange of the main body, but will rather form a transition between the at least one temporary clamp and the main body. The at least one temporary clamp thereby comes to rest on the support plate and the support plate, in turn, comes to rest on the first flange of the main body.

For example, the support plate may be inserted into the through passage from above, e.g. from the upper opening through the second flange, at the second end of the main body.

The support plate may comprise a central through opening, through which the cable may extend further upward, e.g. towards the sealing sleeve and further. The support plate opening may have an inner diameter that is smaller than a nominal inner diameter of the through passage in the main body.

Before the support plate is inserted in the through passage, a relatively large annular space is present between the cable and the main body, e.g. at the first flange. This space is reduced by inserting the support plate, since the inner diameter of the opening in the support plate is smaller than the inner diameter of the through passage. As a result of this reduced space, the at least one temporary clamp can be vertically supported at a location closer to the cable, which reduces bending moments acting onto the cable that could otherwise possibly damage the cable.

The benefit of reducing the space with the support plate, compared to when the entire main body would comprise a narrow through passage by itself, is that the initial large through passage in the main body facilitates the inserting of the cable. Once the cable has been inserted, the space can be reduced by means of the support plate.

An outer diameter of the support plate is smaller than the nominal inner diameter of the through passage, to enable the support plate to be inserted into the through passage. The outer diameter of the support plate may be larger than an inner diameter of the first flange, to effect that the support plate will indeed come to rest on the first flange, instead of falling right through.

In a further embodiment of the hang-off device, the support plate comprises multiple support plate segments, which are each configured to be inserted in the through passage, e.g. around the cable, to form the support plate within the through passage. The entire annular support plate is thereby composed of multiple support plate segments, which together form the entire support plate.

The provision of the multiple support plate segments may provide for more convenient insertion of the support plate into the through passage. The support plate segments are individually smaller than an entire support plate and are therefore more convenient to handle within the transition piece, reducing the human effort that is required for the installation of the hang-off device.

In an embodiment of the hang-off device, the at least one solid sealing element is configured to deform towards the cable conductor and towards the sealing sleeve upon installation. This deforming may take place in a plane perpendicular to the longitudinal direction, e.g. in a horizontal plane, and is used to improve the quality of the seal that is established between the respective cable conductor and the sealing sleeve.

Upon inserting the at least one solid sealing element in the sealing passage, it may, seen in the longitudinal direction, have a certain initial cross-section. The combined initial cross-sections of all solid sealing elements may, according to the present embodiment, be somewhat smaller than the remaining cross-section of the sealing passage, e.g. the cross-section that is defined between the sealing wall and the cable conductors. This smaller cross-section may provide for more convenient inserting of the solid sealing elements, compared to when the solid sealing elements were to fit snugly.

However, proper airtight sealing may not be safeguarded yet, in this initial state. To improve the sealing after inserting of the solid sealing elements, the solid sealing elements may be deformed towards the cable conductor and the sealing sleeve. This deforming towards a deformed state increases the cross-section of the respective solid sealing elements towards a deformed cross-section that is larger than their initial cross-section. As a result, the deformed solid sealing elements may come to fit snugly and the combined deformed cross-sections of all solid sealing elements may be the same as the remaining cross-section of the sealing passage. Accordingly, the snugly fitted deformed solid sealing elements may provide for an improved and airtight seal.

The hang-off device according to the present embodiment may, on the one hand, facilitate the inserting of the solid sealing elements into the sealing passage and may simultaneously provide for an improved and airtight seal.

In a further embodiment, the at least one solid sealing element comprises a deformable polyurethane material and two rigid sealing plates. In an installed configuration, the two rigid sealing plates may be disposed in a plane perpendicular to the longitudinal direction, e.g. in a horizontal plane.

The polyurethane material may result in optimal airtight sealing of the sealing passage, whereas the use of the rigid sealing plates may contribute in increasing the mechanical strength of the solid sealing elements.

The rigid sealing plates may comprise a cast iron material, which may, on the one hand, provide for sufficient mechanical strength and rigidity whilst, on the other hand, enabling good formability into a desired shape.

The polyurethane material is arranged in between the rigid sealing plates and may thereby also extend in a horizontal plane. A sandwich-like solid sealing element may thereto be obtained, which may have a polyurethane material in the middle that is covered at the top and at the bottom with a respective rigid sealing plate.

The polyurethane material is configured to laterally deform in a plane perpendicular to the longitudinal direction, upon clamping the rigid sealing plates towards each other in the longitudinal direction. The deformation of the polyurethane material may be elastic and the clamping of the rigid sealing plates in the longitudinal direction, e.g. in the vertical direction, will effect a compression of the polyurethane material. As a result of the Poisson-type elastic deformation, the compression of the polyurethane material in the longitudinal direction will effect expansion of the polyurethane material in the plane perpendicular to the longitudinal direction, e.g. in the horizontal plane.

The expansion the polyurethane material in the horizontal plane may effect that the polyurethane material will come in contact with the sealing wall and the cable conductors and that the polyurethane material of each two adjacent solid sealing elements will come in contact with each other. This contact improves the sealing of the sealing passage, but was not present in the initial state of the solid sealing element and thereto allowed for the more convenient inserting of the solid sealing elements into the sealing passage.

In a further embodiment, the at least one solid sealing element comprises at least one fastener for clamping the rigid sealing plates towards each other. The at least one fastener is thereby configured to pull an upper rigid sealing plate and a lower rigid sealing plate towards each other in the longitudinal direction, e.g. in the vertical direction. Accordingly, the polyurethane material in between the rigid sealing plates will expand in a perpendicular plane, e.g. in the horizontal plane.

The at least one fastener for example comprises at least one nut and bolt. The rigid sealing plates may thereto each comprise a corresponding number of through holes aligned in the longitudinal direction. For clamping the rigid sealing plates against each other, the bolts may be inserted through the respective longitudinal holes in each of the rigid sealing plates, after which a nut may be provided on each bolt. Accordingly, the rigid sealing plates may be clamped onto each other between the nut and a head of the bolt.

In a further embodiment, the at least one tensioner comprises a respective bolt for each of the at least one temporary clamps. Each of the temporary clamps thereby comprises its own bolt for applying the clamping force onto the temporary clamp and therefore onto the cable. Each of the bolts is accessible from outside the main body, so that the clamping force can applied and released from outside the main body, thus after installation of the hang-off device.

According to this embodiment, each bolt is associated with a corresponding nut in the main body. The nuts may be fixedly attached to the main body, for example by means of a welded connection, and may be evenly spread around the circumference of the main body. The nuts and the bolts are provided with respective corresponding inner and outer threads. Each of the bolts may protrude into the through passage in the main body from the outside, e.g. through a respective nut, wherein the heads of the bolts remain outside the main body, in order to be gripped by a spanner for rotating the bolts with respect to the main body.

When the bolts are rotated with respect to the main body, the interlocking threads of the bolts and the nuts will effect an axial displacement of the bolt in a radial direction, seen with respect to the longitudinal direction. The bolts are thereby configured to press their respective temporary clamp away from the main body in a radially inward direction, e.g. upon rotating the bolts in a clockwise direction with respect to the main body, thereby applying the clamping force onto the cable within the though passage. Accordingly, the bolts are configured to release the clamping force from the cable and the temporary clamps when they are axially displaced in a radially outward direction, e.g. upon rotating the bolts in a counter-clockwise direction with respect to the main body.

The provision of a separate bolt for each of the temporary clamps may provide that the applied clamping force on the cable may be accurately controlled for each of the temporary clamps, e.g. by adjusting the rotation of the bolt with respect to the main body. Accordingly, the deformations of the outside of the cable under the influence of the clamping forces is avoided and the pressure on the cable is reduced to zero after final installation.

A further benefit of this embodiment is that the temporary clamps can be moved with respect to the main body, to adjust the orientation of the clamps. As such, the position of the clamps can be accommodated to the position of the cable that is to be inserted in the hang-off device. If, for example, the cable does not extend through the main body of the hang-off device entirely vertically, but for example at a slight angle, the clamps can tilt accordingly so that they optimally abut the cable. Furthermore, the adjustable temporary clamps can also settle towards a specific shape of the cable, i.e. not only in terms of cable diameter, but also in terms of cable shape, such as circular or oval.

The present invention further provides a sealing assembly for a cable hang-off device as described above. The sealing assembly comprises a sealing sleeve, which is configured to be attached to a flange of a main body of the hang-off device and which comprises a cylindrical wall that defines a sealing passage for one or more conductors of a cable, and comprises at least one solid sealing element, which is configured to be installed within the sealing passage in order to at least partially surround the one or more cable conductors to seal the sealing passage.

The sealing assembly according to the present invention can be retrofitted on an existing cable hang-off device for sealing the existing hang-off device, or at least for improving the sealing properties thereof. Furthermore, the sealing assembly according to the present invention may be used for other types of hang-off devices, for example for hang-off devices with a non-temporary clamps for clamping the cable, in which the cable is permanently held by means of clamps.

The sealing sleeve of the hang-off device may, at least in an installed configuration of the hang-off device, be arranged on top of the main body. The sealing sleeve comprises a cylindrical wall that defines a through sealing passage through the sealing sleeve.

The sealing sleeve may comprise a sleeve flange at its lower end, with which it is configured to be attached to the flange of the main body. The sleeve flange may be an inner flange, e.g. within the sealing passage, or an outer flange, e.g. arranged outside the cylindrical wall of the sealing sleeve, or may be a combination of an inner flange and an outer flange. The sealing flange may be provided with one or more through holes in the longitudinal direction, wherein a pattern of these one or more longitudinal through holes may substantially correspond to a pattern of longitudinal through holes in second flange of the main body, in order enable fastening of the sealing sleeve onto the main body by means of a bolted or riveted connection.

The sealing assembly according to the present invention comprises at least one solid sealing element, which is configured to be installed within the sealing passage of the sealing sleeve. The at least one solid sealing element may be inserted into the sealing passage from above, e.g. from an upper head end opening in the cylindrical wall of the sealing sleeve. The at least one solid sealing element is configured to at least partially surround the one or more cable conductors in the sealing passage after being inserted therein.

The at least one solid sealing element may comprise multiple solid sealing elements, which may, in combination be configured to form a transverse sealing wall in the sealing passage, which extends in a plane perpendicular to the longitudinal direction, e.g. in a horizontal plane.

The sealing wall that is formed by the combined solid sealing elements may have a shape that substantially corresponds to a cross-section of the cylindrical wall of the sealing sleeve. In particular, the perimeter of all combined solid sealing elements may substantially correspond to the perimeter of the cylindrical wall of the sealing sleeve, in order to form a substantially airtight seal between them.

The solid sealing elements may comprises a recess at their portions that are configured to about the cable conductors, wherein the recesses in the solid sealing elements substantially corresponds to a cross-sectional shape of a cable conductor. As such, an airtight seal may be formed between the cable conductors and the solid sealing elements as well.

The number of sealing elements may correspond to the number of conductors in the cable. As such, each of the solid sealing elements may accommodate a single cable conductor in its respective recess or a respective cable conductor may be sealed in between each two adjacent solid sealing elements. In particular, the hang-off device may comprise three solid sealing elements for sealing against a cable that comprises three conductors.

The at least one solid sealing element may make the use of resin obsolete for forming a seal within the sealing passage. Hence, the solid sealing elements are free of fluid and do not involve curing times or the like. Instead, the sealing of the at least one solid sealing element may be safeguarded right after installation within the sealing sleeve.

As a result, the present sealing assembly provides the advantage over the known ways of sealing hang-off devices, in that it is no longer necessary to await curing before the hang-off device is completed and able to form a proper airtight seal, wherein this reduction in downtime reduces costs. The lack of resin may also provide that the sealing properties can be safeguarded over a longer period of time, since the solid sealing elements may not be prone to deterioration.

Furthermore, the solid sealing elements according to the present invention are easier to handle within the transition piece, making the installation more convenient. Similarly, the solid sealing elements can be easily removed from the sealing sleeve when service or maintenance is required in inners parts of the hang-off device, which forms a further advantage over the resin that hardens in the hang-off device. Finally, dangerous fumes in the turbine's compartments may no longer occur, since it is no longer essential to use resin for sealing the hang-off device, which means that the sealing assembly according to the present invention is also safer to install.

In embodiments, the sealing assembly may comprise one or more of the features described above for the sealing sleeve of the cable hang-off device according to the present invention and/or for the at least one solid sealing element of the cable hang-off device according to the present invention.

The present invention also provides a method for holding a cable in a wind turbine transition piece by means of a cable hang-off device as described above. The method comprises the steps of:
  attaching the main body to the transition piece with a first flange thereof,
  attaching the sealing sleeve to the opposed second flange,
  inserting a cable through the through passage and the sealing passage,
  clamping an outer serving of the cable with the at least one temporary clamp,
  pealing the outer serving of the cable, e.g. above the temporary clamp, to reveal armour wires of the cable,
  folding the armour wires over the second flange in a radially outward direction, seen with respect to the longitudinal direction,
  inserting the clamping plate in the sealing passage,
  clamping, with the clamping plate, the armour wires against the second flange,
  releasing the at least one temporary clamp,
  inserting the at least one solid sealing element in the sealing passage to at least partially surround one or more conductors of the cable, and
  sealing the sealing passage with the at least one solid sealing element.

According to the present invention, the hang-off device is installed piece-by-piece, prior to the holding of the cable in the wind turbine transition piece. Compared to the known ways of installing such a hang-off device, the present method does not require the use of resin for forming a seal in the hang-off device, e.g. around the cable conductors. Instead, the cable hang-off device according to the present invention comprises at least one solid sealing element that is installed to form a seal for preventing dangerous gasses from passing from the bottom part of the transition piece towards the top part.

The hang-off device is installed in an interior of the transition piece, for example within a separation wall of the transition piece that separates the bottom part of the transition piece from the top part of the transition piece.

After being attached to the transition piece, the through passage of the main body becomes aligned with a hole or passage through which the cable is guided into the interior of the transition piece. The sealing sleeve of the hang-off device is attached to the second flange of the main body and comprises a cylindrical wall that defines a through sealing passage through the sealing sleeve, which forms a continuation of the through passage though the main body.

Accordingly, the cable can be inserted in the through passage of the main body, such that it may extend from the first end of the main body towards the second end of the main body. The cable further extends through the sealing passage in the sealing sleeve and may extend even further upwards, e.g. towards the gondola of the turbine.

According to the present method, the hang-off device only clamps the cable temporarily, which means that the required clamping force may be lower than when the cable is clamped permanently, since the clamping not needs to be safeguarded for decades. The lower clamping forces reduce the risk of having irregularities in the cable and thereby ensure that the cable does not need to be replaced early.

The cable is pealed at or near the location of the second flange of the main body, in order to reveal armour wires of the cable. These armour wires are bent radially outward, away from the longitudinal direction, and are arranged on top of the second flange of the main body. The clamping plate is be arranged on top of the armour wires and on the second flange. Upon attaching the clamping plate to the second flange, for example by means of a bolted connection, the clamping plate and the second flange are pulled towards each other. Accordingly, a clamping force is exerted on the armour wires that are located in between the clamping plate and the second flange. The clamping force will effect a frictional force in an elongate direction of the armour wires, which will permanently hold the cable in place within the hang-off device.

Accordingly, the cable will become suspended on its armour wires in an installed configuration of the hang-off device. The tensioning of the armour wires will, opposed to the clamping of the cable's outer serving, not result in significant irregularities in the cable conductors.

The at least one temporary clamp is released right after the cable has been held permanently via its armour wires, which provides that the risk of inducing irregularities in the cable conductors can be removed right away.

The method further comprises the inserting of the at least one solid sealing element into the sealing passage, which are for example inserted into the sealing passage from above, e.g. from an upper head end opening in the cylindrical wall of the sealing sleeve. The at least one solid sealing element then at least partially surrounds the one or more cable conductors.

The at least one solid sealing element may comprise multiple solid sealing elements, which may, in combination, form a transverse sealing wall in the sealing passage, which extends in a plane perpendicular to the longitudinal direction, e.g. in a horizontal plane.

The use of at least one solid sealing element may make the use of resin obsolete for forming a seal within the sealing passage. Hence, the at least one solid sealing element is free of fluid and do not involve curing times or the like. Instead, the sealing of the at least one solid sealing element may be safeguarded right after installation within the sealing sleeve.

As a result, the present method provides the advantage over the known ways of installing a cable hang-off device, in that it is no longer necessary to await curing before the hang-off device is completed and able to form a proper airtight seal, wherein this reduction in downtime reduces costs. The lack of resin may also provide that the sealing properties can be safeguarded over a longer period of time, since the solid sealing elements may not be prone to deterioration.

Furthermore, the solid sealing elements of the present method are easier to handle within the transition piece, making the installation more convenient. Similarly, the solid sealing elements can be easily removed from the sealing sleeve when service or maintenance is required in inners parts of the hang-off device, which forms a further advantage over the resin that hardens in the hang-off device. Finally, dangerous fumes in the turbine's compartments may no longer occur, since it is no longer essential to use resin for sealing the hang-off device, which means that the method according to the present invention is also safer to carry out.

In an embodiment of the method, the inserting of the clamping plate comprises the inserting of multiple clamping plate segments around the cable conductors. The entire annular clamping plate is thereby composed of multiple clamping plate segments, which form the entire clamping plate.

The provision of the multiple clamping plate segments may provide for more convenient insertion of the clamping plate into the sealing passage. The clamping plate segments are individually smaller than an entire clamping plate and are therefore more convenient to handle within the transition piece, reducing the human effort that is required for the installation of the hang-off device.

In an alternative or additional embodiment of the method, the at least one solid sealing element comprises a deformable polyurethane material and two rigid sealing plates. After installation, the two rigid sealing plates may be disposed in a plane perpendicular to the longitudinal direction, e.g. in a horizontal plane.

The polyurethane material may result in optimal gastight sealing of the sealing passage, whereas the use of the rigid sealing plates may contribute in increasing the mechanical strength of the solid sealing elements.

The rigid sealing plates may comprise a cast iron material, which may, on the one hand, provide for sufficient mechanical strength and rigidity whilst, on the other hand, enabling good formability into a desired shape.

The polyurethane material is arranged in between the rigid sealing plates and may thereby also extend in a horizontal plane. A sandwich-like solid sealing element may thereto be obtained, which may have a polyurethane material in the middle that is covered at the top and at the bottom with a respective rigid sealing plate.

According to the present embodiment, the sealing of the sealing passage comprises the lateral deforming of the polyurethane material in a plane perpendicular to the longitudinal direction by clamping the rigid sealing plates towards each other in the longitudinal direction. The deformation of the polyurethane material may be elastic and the clamping of the rigid sealing plates in the longitudinal direction, e.g. in the vertical direction, will effect a compression of the polyurethane material. As a result of the Poisson-type elastic deformation, the compression of the polyurethane material in the longitudinal direction will effect expansion of the polyurethane material in the plane perpendicular to the longitudinal direction, e.g. in the horizontal plane.

The expansion the polyurethane material in the horizontal plane may effect that the polyurethane material will come in contact with the sealing wall and the cable conductors and that the polyurethane material of each two adjacent solid sealing elements will come in contact with each other. This contact improves the sealing of the sealing passage, but was not present in the initial state of the solid sealing element and thereto allowed for the more convenient inserting of the solid sealing elements into the sealing passage.

In a further embodiment of the method, wherein at least both the steps of attaching the main body and attaching of the sealing sleeve are carried out onshore. The main body may be attached to the transition piece during manufacturing of the transition piece and the sealing sleeve may be attached to the main body, during manufacturing of the transition piece as well.

This onshore attaching has the advantage that it is not required to manoeuvre the main body and the sealing sleeve in the tight interior spaces of the transition piece, for example through manholes or the like, which is difficult due to the large weight of the main body and the poor accessibility for lifting tools. Instead, the main body and the sealing sleeve can be easily installed during manufacturing in a workshop, when the interior space of the transition piece has not yet been fully closed.

The onshore attaching may be particularly beneficial for the attaching of a single-piece main body and a single-piece sealing sleeve, which are free of parting seams and may, for example, each comprise a single tubular piece onto which flanges may be attached by means of welded connections. Hence, the onshore attaching enables that the cable may be guided through the single-piece main body and the single-piece sealing sleeve at a later point in time, e.g. after the transition piece has been installed on the turbine's foundation, whereas the prior art hang-off device had to be installed only after the cable had been guided into the transition piece.

In an embodiment, the method comprises the step of attaching a single-piece sealing sleeve to the main body. According to this method, the steps of inserting and sealing may be formed by the sealing of the sealing passage with a sealing element that comprises a cured resin. This resin-based sealing element may only partly fill the sealing passage of the sealing sleeve to obtain the desired level of sealing.

Compared to the known methods of installing hang-off devices, the single-piece sealing sleeve may only require a much smaller amount of resin to be used, since the sealing passage does not need to be filled entirely. Hence, the drawbacks of using resin are thereby minimized, when compared to the known hang-off devices that rely on relatively large amounts of resin to obtain a proper seal, e.g. without single piece sealing sleeves.

For the forming of this seal within the sealing passage, a small amount of two-component resin may be supplied in a mixing bag that initially comprises two separate compartments, wherein each of the resin's components is packaged in a separate compartment. A separation wall between the compartments of the mixing bag may be broken, in order to allow both components to become mixed. After mixing, an opening may be made in the mixing bag, in order to fill the sealing passage in the single-piece sealing sleeve with the mixed two-component resin.

The use of this mixing bag is possible, since only a small amount of resin is required for use in the hang-off device with the single-piece sealing sleeve. The mixing bag thereby provides the advantage that the mixing can take place while the resin in the mixing bag is closed-off from the surroundings, and thus closed-off from personnel that is installing the hang-off device. Accordingly, the release of dangerous fumes is minimized and the curing time is also relatively short, due to the relatively small amount of resin that is used.

BRIEF DESCRIPTION OF THE DRAWINGS

Further characteristics of the invention will be explained below, with reference to embodiments, which are displayed in the appended drawings, in which.

Throughout the figures, the same reference numerals are used to refer to corresponding components or to components that have a corresponding function.

DETAILED DESCRIPTION OF THE EMBODIMENTS

Figure 1:
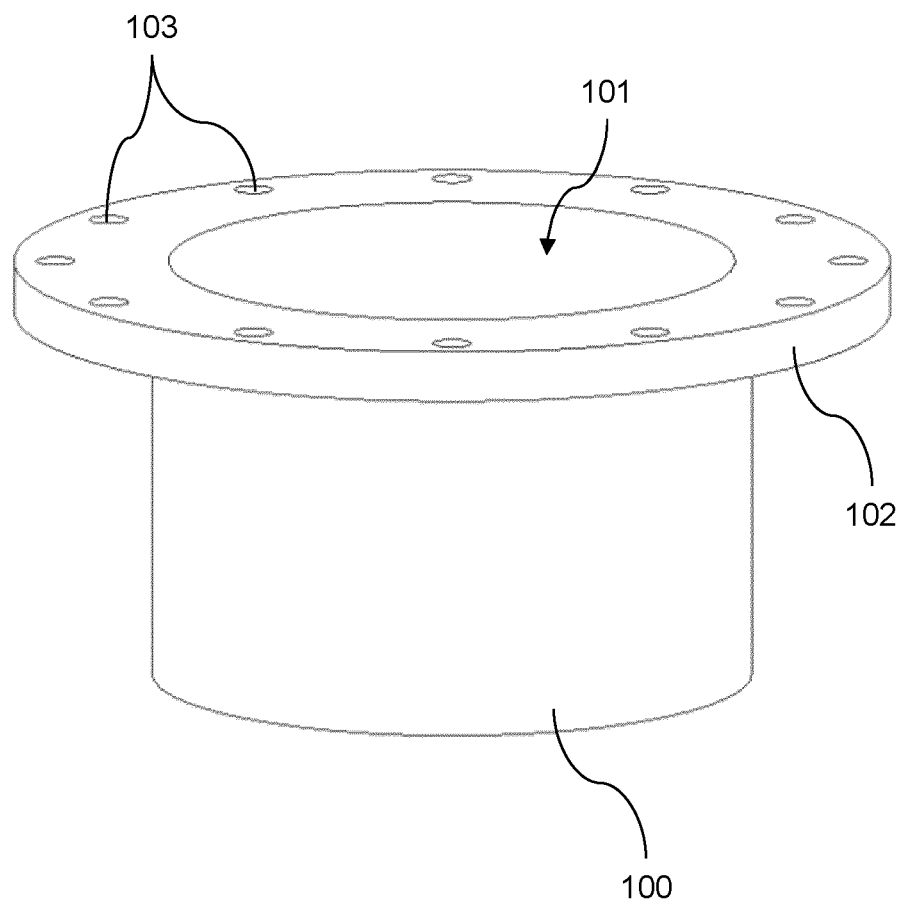
FIGS. 1-10B schematically depict an embodiment of the method according to the present invention for the installing of an embodiment of the cable hang-off device according to the present invention.

FIG. 1 schematically depicts a passage of a wind turbine transition piece 100, to which is referred with reference numeral. The passage 101 is located in an interior of the transition piece, where a cable is supposed to be guided into the transition piece interior. The passage 101 comprises a passage flange 102, which comprises an annular shape around the passage and which comprises a plurality of through holes 103, which are disposed evenly around the passage 101.

Figure 2:
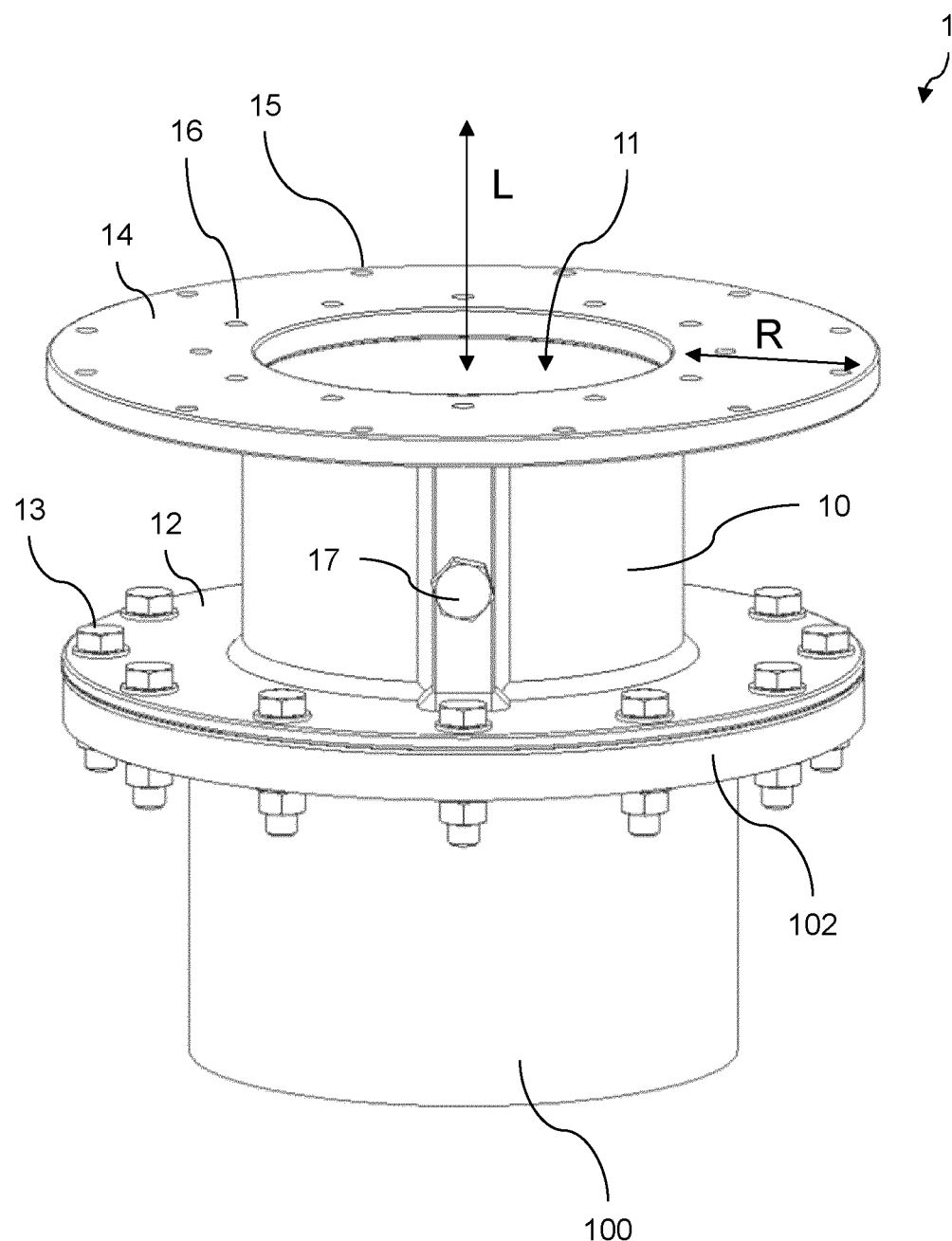

In FIG. 2, it is displayed that a main body 10 of a cable hang-off device 1 is attached to the transition piece 100. The main body 10 extends in a longitudinal direction L of the hang-off device 1, which is aligned parallel to the vertical direction. The main body 10 is a tubular element that comprises a through passage 11, which extends in the longitudinal direction L.

The main body 10 comprises a first flange 12, which is provided at a first, lower end of the main body 10 and which is attached to the tubular element by means of a welded connection. The first flange 12 extends in a horizontal plane and is embodied as a combined inner and outer flange, which is both located within the through passage 11 and arranged outside the through passage 11.

The main body is a single-piece main body 10, which is free of parting seams and is therefore less prone to leakages, compared to the know split main bodies. The single-piece main body 10 comprises of a single tubular piece onto which flanges are attached by means of welded connections, which provide for fewer discontinuities than the split design that is known from prior art.

The main body 10 is attached to the transition piece 100 by means of the first flange 12 that is attached to the flange 102 of the transition piece 100. The first flange 12 thereto comprises a plurality of through holes in the longitudinal direction L, which are arranged in a pattern that corresponds to the pattern of the holes 103 in the transition piece flange 102. The hang-off device 1 comprises a plurality of bolts 13, each of which extends through two corresponding holes for forming a rigid bolted connection between the main body 10 and the transition piece 100.

After being attached to the transition piece 100, the through passage 11 of the main body 10 is with the transition piece passage 101 through which a cable is to be guided into the interior of the transition piece 100. Accordingly, the cable can later be inserted in the through passage 11 of the main body 10.

The main body 10 further comprises a second flange 14, which is provided at a second, upper end of the main body 10 and which is attached to the tubular element by means of a welded connection. The second flange 14 is aligned parallel to the first flange 12, also extending in a horizontal plane. The second flange 14 is embodied as an outer flange, which is arranged outside the through passage 11.

The second flange 14 is also provided with multiple holes 15, 16 in the longitudinal direction L. A first set of through holes 15 is provided in the second flange 14 in an outer ring pattern and a second set of non-through, e.g. blind holes 16 is provided in the second flange 14 in an inner ring pattern. The outer ring pattern of the first set of through holes 15 is located outside the inner ring pattern of the second set of blind holes 16, when seen in a radial direction R that is aligned radial with the longitudinal direction L.

The main body 10 further comprises multiple tensioners, which each comprise a respective bolt 17 for a temporary clamp that is inserted in the through passage 11 later. The bolts 17 are configured to apply a clamping force onto the temporary clamp and is accessible from outside the main body 10, so that the clamping force can applied and released from outside the main body 10, thus after installation of the hang-off device 1. Each bolt 17 is associated with a corresponding nut in the main body 10 and protrudes into the through passage 11 in the main body 10 from the outside, wherein the head of the bolt 17 remains outside the main body, in order to be gripped by a spanner for rotating the bolt 17 with respect to the main body 10.

The main body 10 of the hang-off device 1 is attached to the transition piece 100 onshore, during manufacturing of the transition piece 100. This onshore installation has the advantage that it is not required to manoeuvre the main body 10 in the tight interior spaces of the transition piece 100, for example through manholes or the like, which is difficult due to the large weight of the main body 10 and the poor accessibility for lifting tools. Instead, the main body 10 can be easily installed during manufacturing in a workshop, when the interior space of the transition piece 100 has not yet been fully closed.

After attaching the single-piece main body 10 to the transition piece 100 onshore, the cable may be guided through the single-piece main body 10 at a later point in time, e.g. after the transition piece 100 has been installed on the turbine's foundation, whereas the prior art hang-off device had to be installed only after the cable had been guided into the transition piece.

Figure 3A:
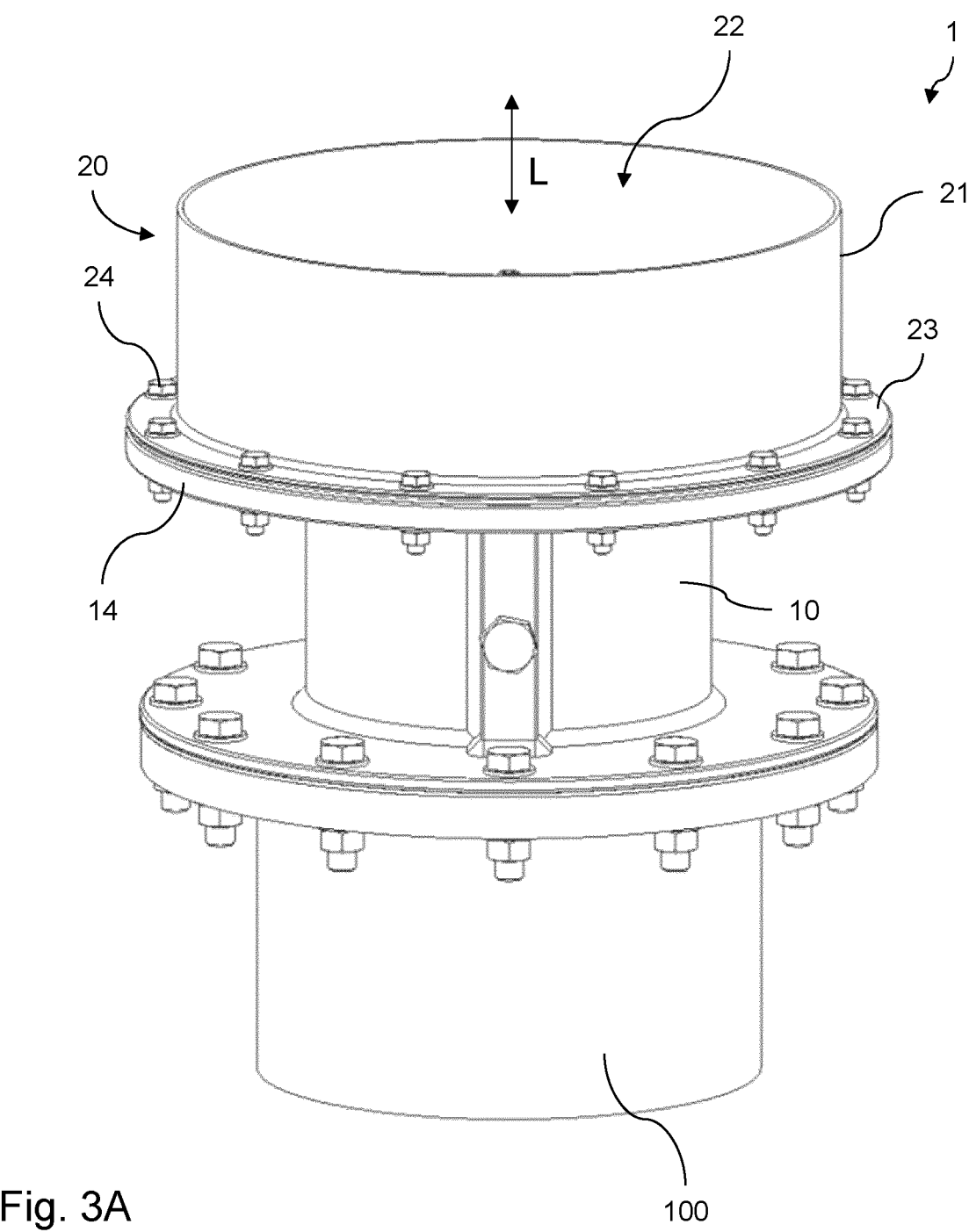

In FIG. 3A, it is displayed that a sealing sleeve 20 of the hang-off device 1 is attached to the main body 10. The sealing sleeve 20 comprises a cylindrical wall 21 that defines a through sealing passage 22 through the sealing sleeve 20, which forms a continuation of the through passage 11 though the main body 10. A cable that is to be inserted in the hang-off device 1 will thereby not only extend through the through passage 11 in the main body 10, but also extends through the sealing passage 22 in the sealing sleeve 20.

The sealing sleeve in FIG. 3A is a single-piece sealing sleeve 20, which is free of parting seams and therefore less prone to leakages. The single-piece sealing sleeve 20 is attached to the single-piece main body 10 onshore, during manufacturing of the transition piece 100. This onshore installation has the advantage that it is not required to manoeuvre the sealing sleeve 20 in the tight interior spaces of the transition piece 100, for example through manholes or the like, which is difficult due to the large weight of the sealing sleeve 20 and the poor accessibility for lifting tools. Instead, the single-piece sealing sleeve can be easily during manufacturing in a workshop, when the interior space of the transition piece 100 has not yet been fully closed.

After attaching the single-piece sealing sleeve 20 to the single-piece main body 10 onshore, the cable may be guided through the single-piece main body 10 and the single-piece sealing sleeve 20 at a later point in time, e.g. after the transition piece 100 has been installed on the turbine's foundation, whereas the prior art hang-off device had to be installed only after the cable had been guided into the transition piece The sealing sleeve 20 comprises a sleeve flange 23 at its lower end, with which the sealing sleeve 20 is attached to the second flange 14 of the main body 10. The sleeve flange 20 is a single-piece outer flange, which is arranged outside the cylindrical wall 21 of the sealing sleeve 20 and which is attached to the cylindrical wall 21 by means of a welded connection.

The sealing flange 23 is also provided with one or more through holes in the longitudinal direction L. A pattern of the sealing flange holes corresponds to the outer ring pattern of the first set of through holes 15 in the second flange 14 of the main body 10. The hang-off device 1 further comprises a plurality of bolts 24, each of which extends through two corresponding holes for forming a rigid bolted connection between the sealing sleeve 20 and the main body 10.

Figure 3B:
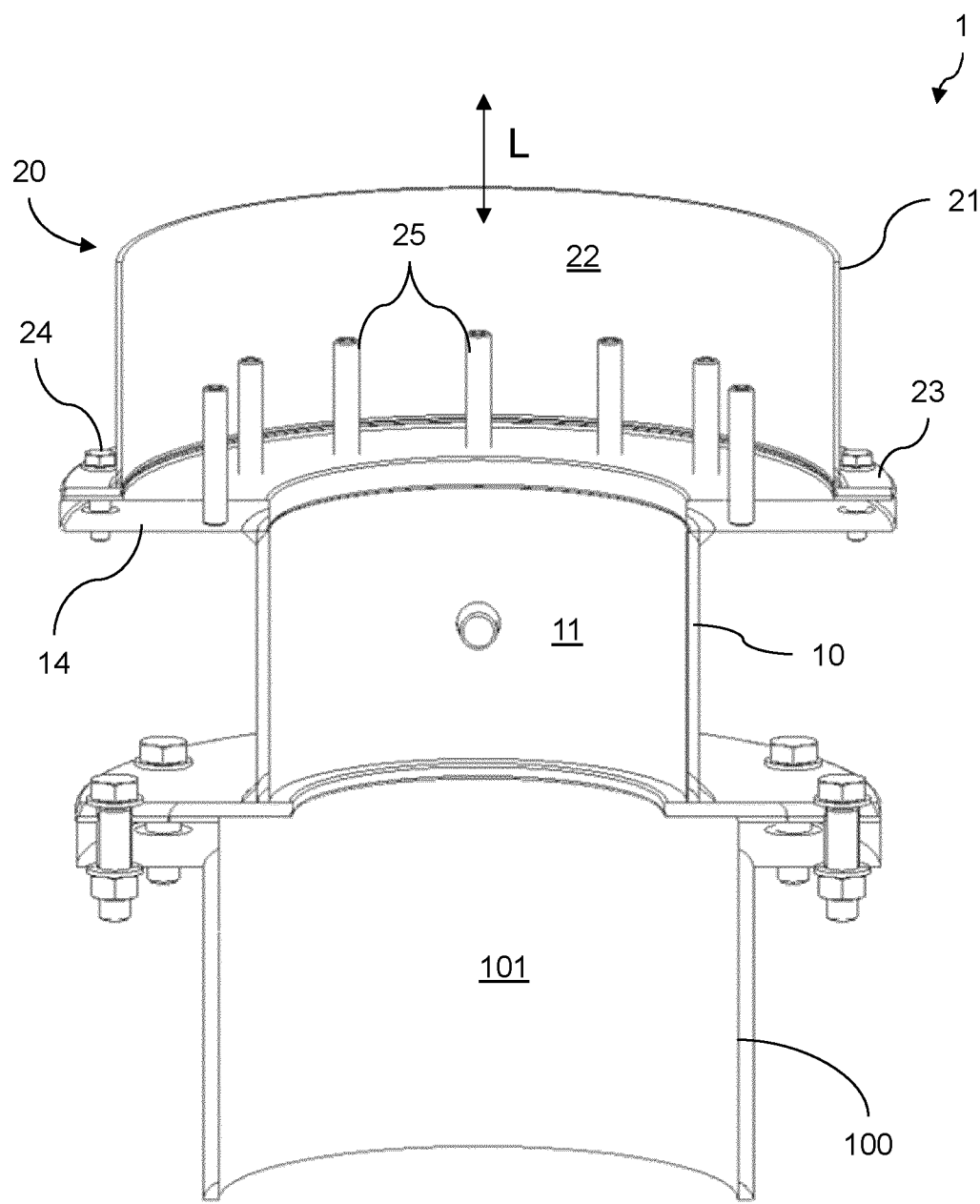

FIG. 3B shows a cross-sectional view on the hang-off device that is displayed in FIG. 3A. It is shown in FIG. 3B that the hang-off device 1 comprises a plurality of stud bolts 25, which are disposed in the sealing passage 22 of the sealing sleeve 20. The stud bolts 25 are, with their outer threads, inserted in the threaded blind holes 16 in the second flange 14 of the main body 10.

Figure 4:
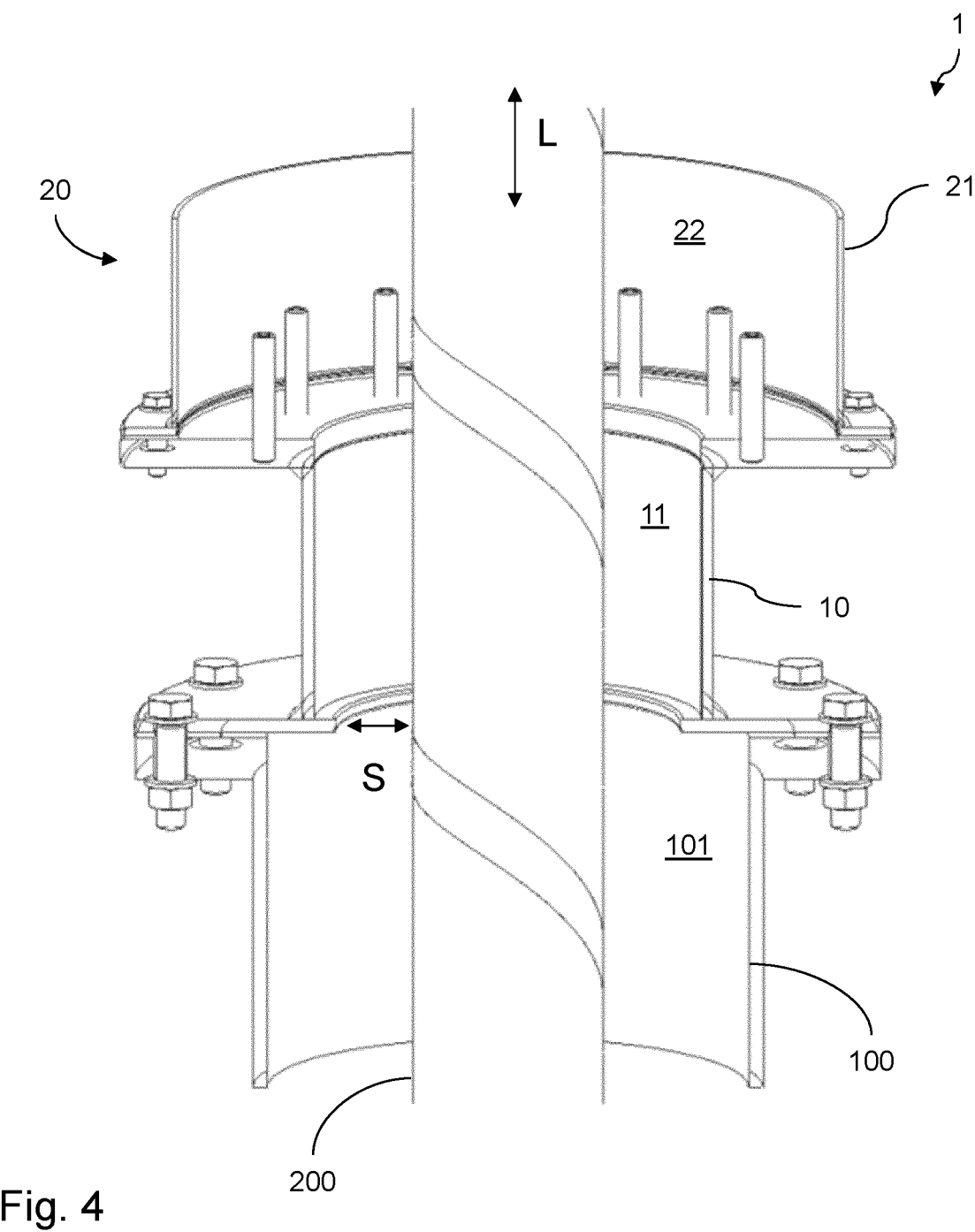

In FIG. 4, it is shown in a cross-sectional view on the hang-off device 1 that a cable 200 is guided into the passage 101 in the transition piece 100 and further upward, through the through passage 11 of the main body 10 and the sealing passage 22 of the sealing sleeve 20.

It is shown in FIG. 4 that a relatively large annular space S is present between the cable 200 and the first flange 12 of the main body 10. This large annular space S provides that the main body 10 facilitates the inserting of the cable 200, since the cable 200 may move within the through passage 11 in lateral directions with respect to the longitudinal direction L.

Figure 5:
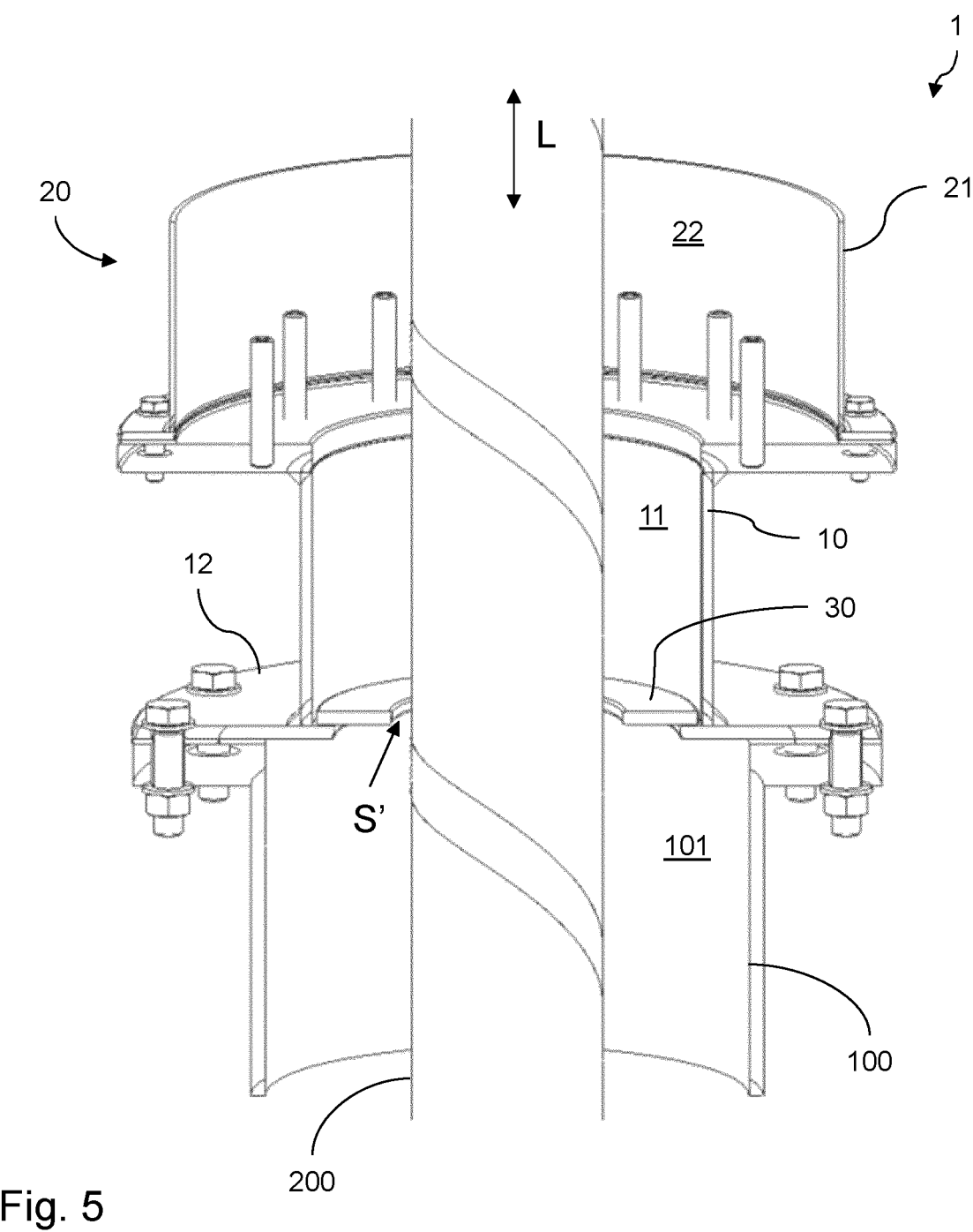

After inserting of the cable 200, a support plate 30 is arranged within the through passage 11 in the main body 10, which is displayed in FIG. 5. The support plate 30 comprises two support plate segments, of which only one is displayed in the cross-sectional view in FIG. 5. The support plate segments which are each inserted in the through passage 11 from above, through the sealing passage 22 in the sealing sleeve 20. The support plate segments surround the cable 200 to form the support plate 30 within the through passage 11.

The support plate 30 has an outer diameter that is smaller than the nominal inner diameter of the through passage 11, to enable the support plate 30 to be inserted into the through passage 11. The outer diameter of the support plate 30 is larger than an inner diameter of the first flange 12, to effect that the support plate 30 comes to rest on the first flange 12.

The support plate 30 is configured to form a support for at least one temporary clamp of the hang-off device 1, which will be explained in the following. The support plate 30 provides that the temporary clamp does not rest directly on the first flange 12 of the main body 10, but will rather form a transition between the temporary clamp and the main body 10. With the support plate 30, the annular space S' between the cable 200 and the first flange 12 is smaller than prior to the inserting of the support plate 30. As a result of this reduced space S', the temporary clamp can be vertically supported at a location closer to the cable 200, which reduces bending moments acting onto the cable 200 that could otherwise possibly damage the cable 200.

The benefit of reducing the space S, S' with the support plate 30, compared to when the entire main body would comprise a narrow through passage by itself, is that the initial large through passage S' in the main body 10 facilitates the inserting of the cable 200. Once the cable 200 has been inserted, the space S' can be reduced by means of the support plate 30.

Figure 6:
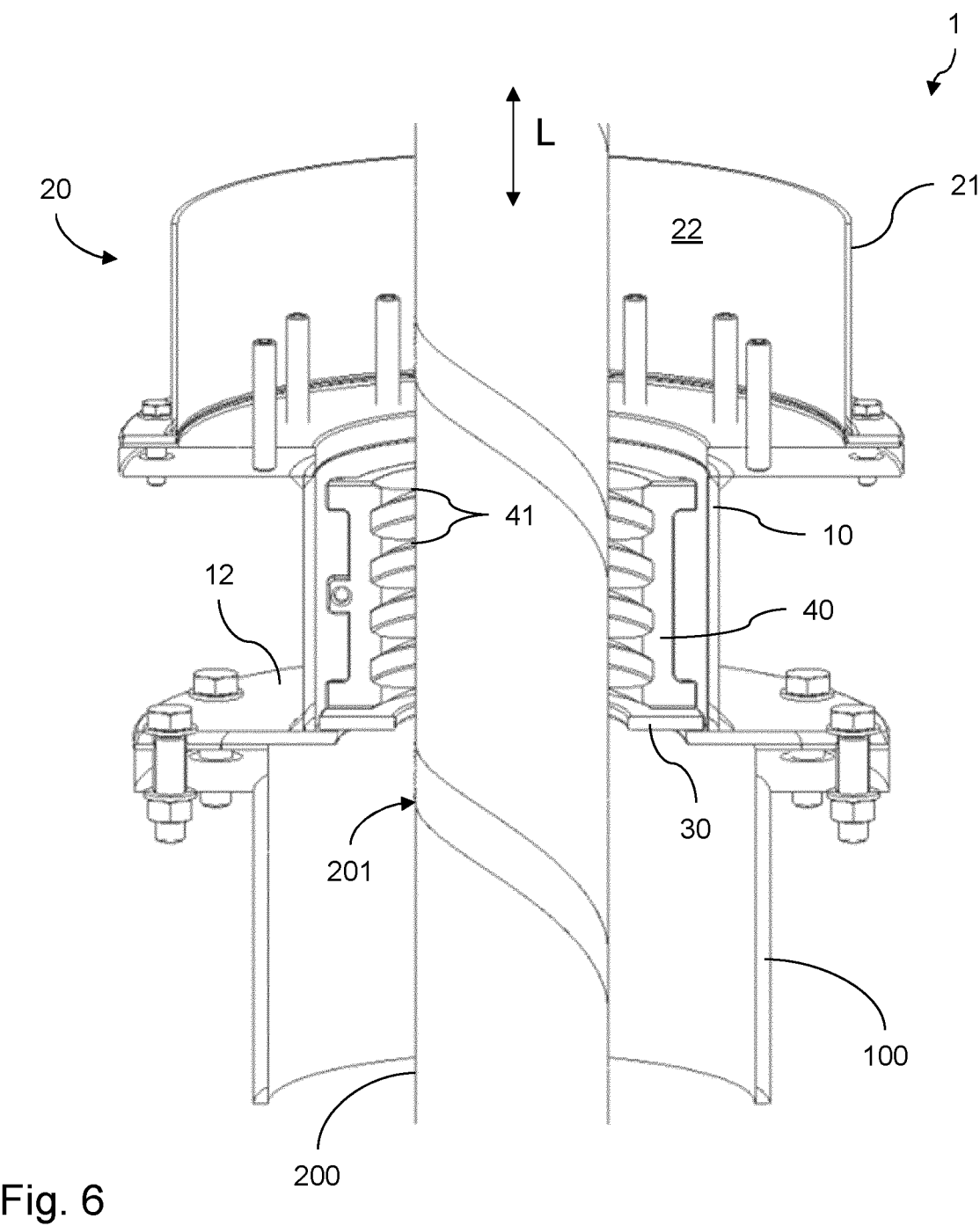

Next, two releasable temporary clamps 40 are inserted in the through passage 11 in the main body 10, as is displayed in FIG. 6. In the cross-sectional view in FIG. 6, only one of the temporary clamps 40 is shown.

The temporary clamps 40 come to rest on the support plate 30, after being inserted in the through passage 11 of the main body 10, and are located in between the main body 10 and the cable 200. Each of the temporary clamps 40 is located where a respective bolt 17 protrudes into the through passage 11. A distal end of each bolt 17 may contact a respective temporary clamp 40 and the bolts 17 are, upon rotation with respect to the main body 10 in a clockwise direction, displaced in a radially inward direction. The bolts 17 are thereby configured to press their respective temporary clamp 40 away from the main body 10 in a radially inward direction, thereby applying the clamping force onto the cable 200 within the though passage 11.

The temporary clamps 40 are configured to clamp the outer serving 201 of the cable 200. The temporary clamps 40 comprise corrugated surfaces for contacting the cable 200, which are provided with a series of ridges, which increase the frictional coefficient at which the clamping force is converted into a frictional force that counteracts the gravitational forces on the cable 200 for holding the cable 200 in place temporarily.

Figure 7:
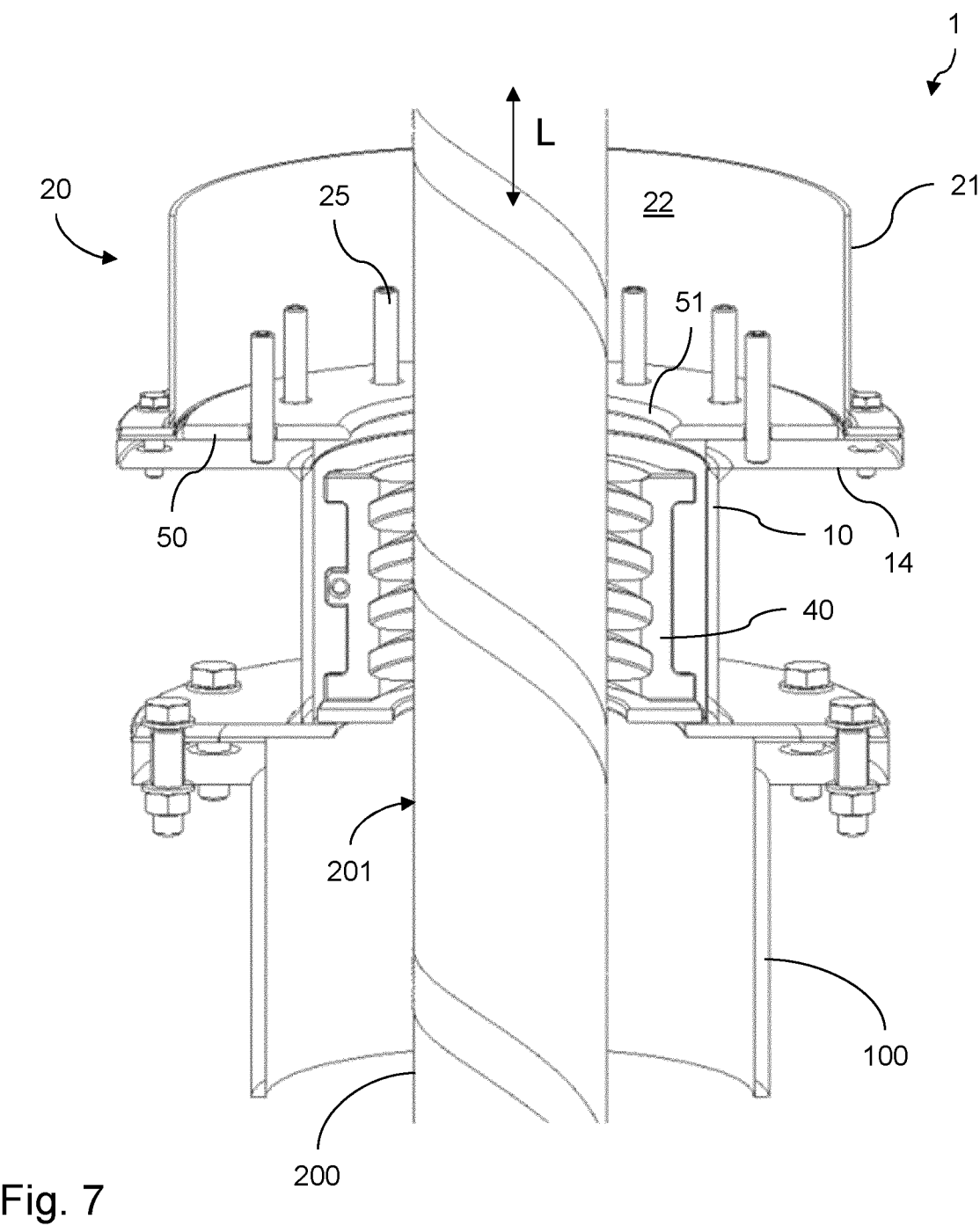

After the cable 200 has been clamped temporarily by means of the temporary clamps 40, a bottom clamping plate 50 is arranged within the sealing passage 22 of the sealing sleeve 20. The bottom clamping plate 50 comprises two bottom clamping plate segments, of which only one is displayed in the cross-sectional view in FIG. 7. The bottom clamping plate segments that are inserted into the sealing passage 22 from above. The bottom clamping plate segments surround the cable 200 to form the entire bottom clamping plate 50 within the sealing passage 22.

The bottom clamping plate 50 is used to permanently hold the cable 200 in the hang-off device 1 and is provided as a planar element, having a shape that substantially corresponds to the shape of the second flange 14 of the main body 10. The bottom clamping plate 50 comprises a central through opening, through which the cable 200 extends further upward.

An upper edge 51 of the central through opening in the bottom clamping plate 50 is rounded, in order to from a smooth guidance surface for armour wires of the cable 200, as will be discussed in the following.

Around the central through opening, the bottom clamping plate 50 comprises multiple through holes in the longitudinal direction L. A pattern of these longitudinal through holes corresponds to the inner ring pattern of the second set of blind holes 16 in the second flange 14 of the main body 10. Accordingly, the bottom clamping plate 50 may be lowered onto the second flange 14 with the stud bolts 25 protruding through the longitudinal holes in the bottom clamping plate 50.

An outer diameter of the bottom clamping plate 50 is smaller than an inner diameter of the sealing sleeve 20 and is also smaller than an inner diameter of the circumferential sealing flange 23. The bottom clamping plate 50 is thereby more narrow than the cylindrical wall 21 and the sealing flange 23 of the sealing sleeve 20 and is therefore capable of being inserted into the sealing passage 22, in order to fit within the sealing flange 23 of the sealing sleeve 22.

The sealing flange 23 and the bottom clamping plate 50 are both arranged directly onto the second flange 14 of the main body 12. Accordingly, both the sealing sleeve 20 and the bottom clamping plate 50 are simultaneously fastened to the second flange 14 by means of a bolted connection.

Figure 8:
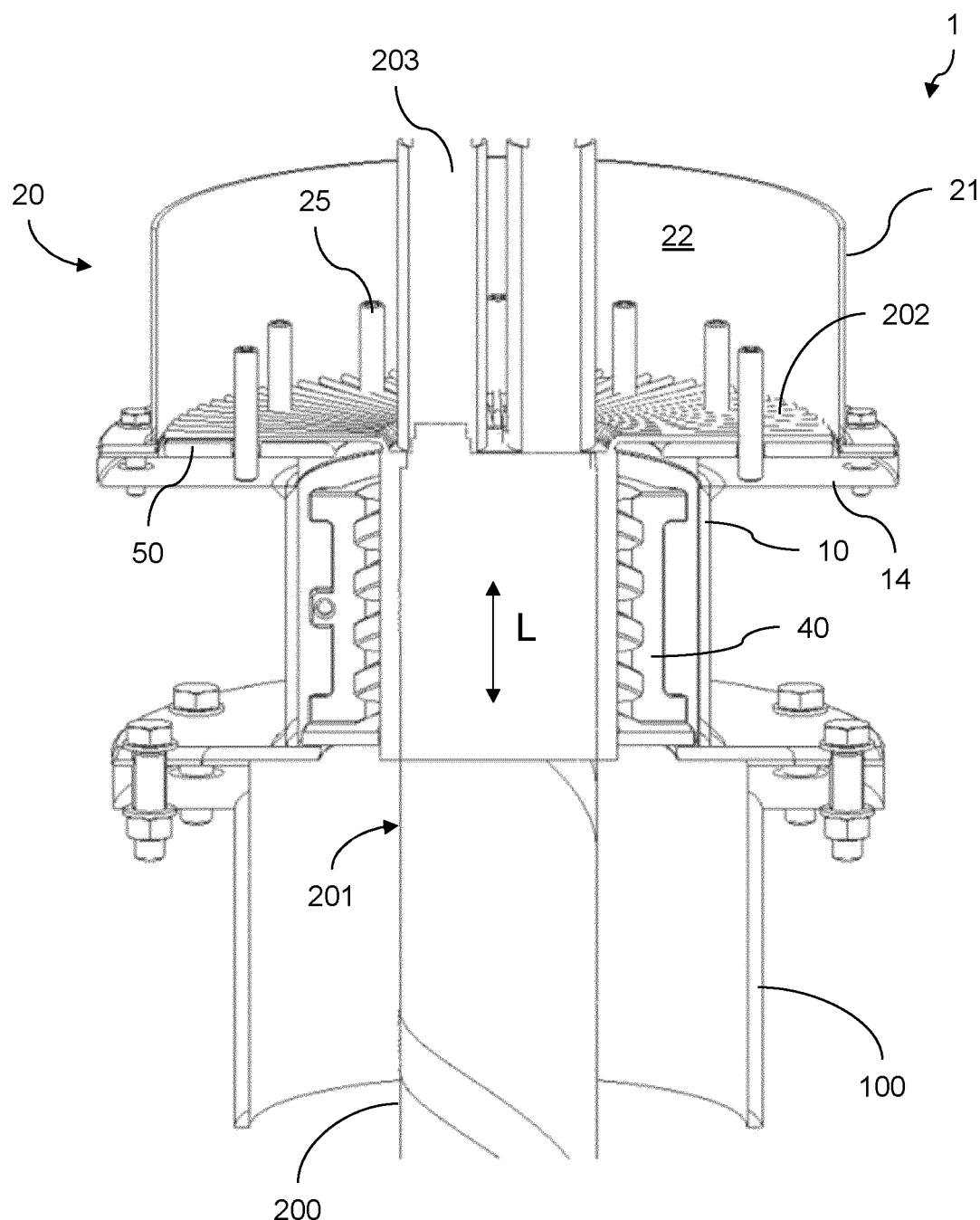

After the bottom clamping plate 50 has been inserted in the sealing passage 22, the cable 200 is pealed at the location of the second flange 14 of the main body 10, which is displayed in FIG. 8. The pealing of the cable 200 reveals armour wires 202 and conductors 203 of the cable 200. The cable 200 shown in the figures comprise a plurality of armour wires 202 that extends in a radial outer portion of the cable 200 and which surround three cable conductors 203 that are configured to conduct electricity during use of the wind turbine.

After pealing, the armour wires 202 are bent radially outward, when seen with respect to the longitudinal direction L. The armour wires 202 extend over the rounded upper edge 51 of the central through opening in the bottom clamping plate 50 and come to lay on top of the bottom clamping plate 50. The exposed cable conductors 202 extend further upward in the sealing passage 22, where a seal is to be formed against them.

Figure 9:
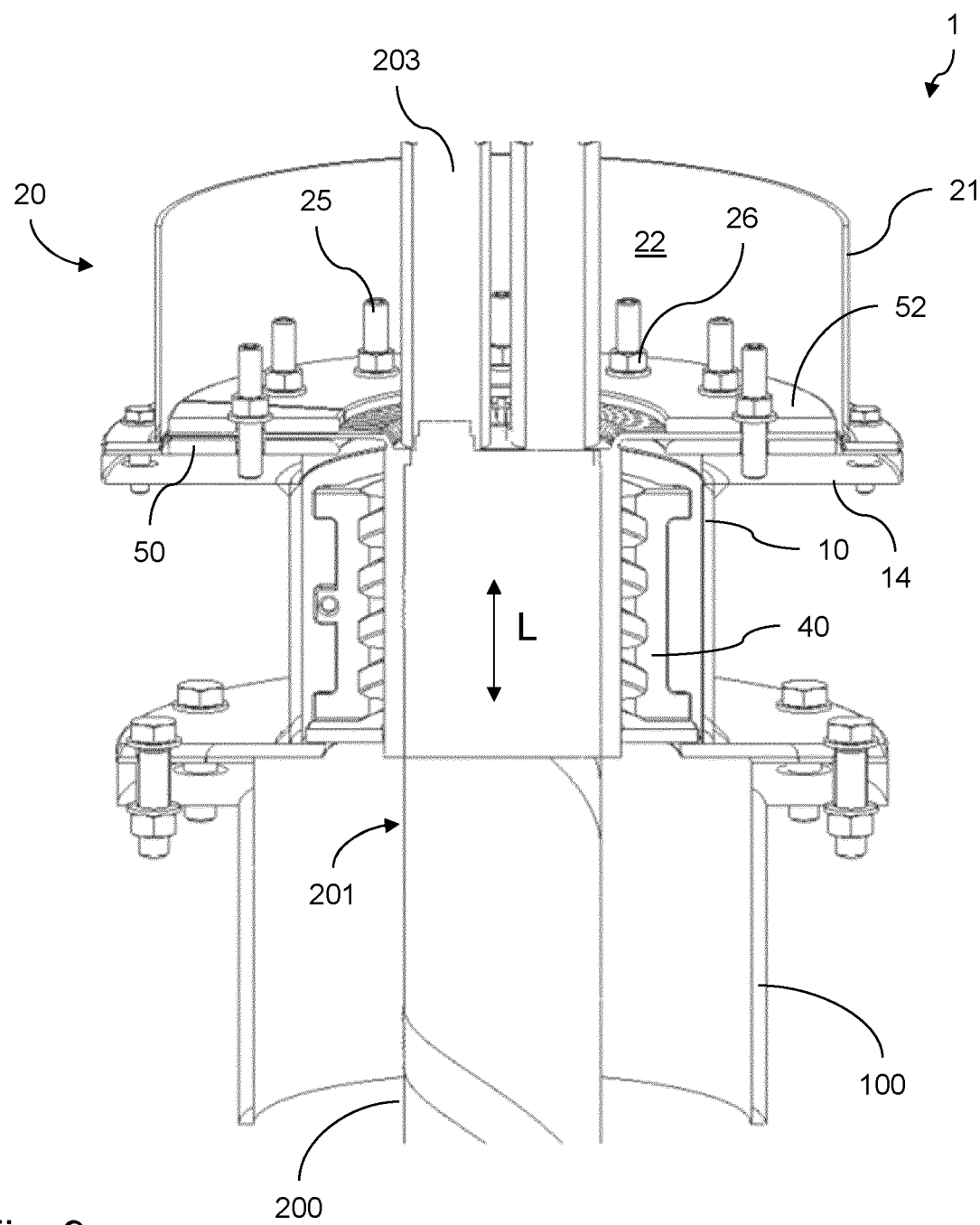

After the pealing of the cable 200 and the bending of the armour wires 202, a top clamping plate 52 is arranged on top of the bent armour wires 202 and the bottom clamping plate 50, as is displayed in FIG. 9.

The top clamping plate 52 comprises two top clamping plate segments, of which only one is displayed in the cross-sectional view in FIG. 9. The top clamping plate segments that are inserted into the sealing passage 22 from above. The top clamping plate segments surround the cable conductors 203 to form the entire top clamping plate 52 within the sealing passage 22.

The top clamping plate 52 is used to permanently hold the cable 200 in the hang-off device 1 and is provided as a planar element as well, having a shape that substantially corresponds to the shape of the bottom clamping plate 50. The top clamping plate 52 comprises a central through opening, through which the cable conductor 203 extend further upward.

Around the central through opening, the top clamping plate 52 comprises multiple through holes in the longitudinal direction L. A pattern of these longitudinal through holes corresponds to the pattern of the longitudinal through holes in the bottom clamping plate 50. Accordingly, the top clamping plate 52 may be lowered onto the armour wires 202 and the bottom clamping plate 50 with the stud bolts 25 protruding through the longitudinal holes in the top clamping plate 52.

An outer diameter of the top clamping plate 52 is smaller than an inner diameter of the sealing sleeve 20 as well. The top clamping plate 52 is thereby more narrow than the cylindrical wall 21 of the sealing sleeve 20 and is therefore capable of being inserted into the sealing passage 22.

Next, each stud bolt 25 is provided with a respective nut 26 that is fastened on the stud bolt 25. Upon fastening, the top clamping plate 52 and the bottom clamping plate 50 are pulled towards each other. Accordingly, a clamping force is exerted on the armour wires 202 that are located in between the top clamping plate 52 and the bottom clamping plate 50. The clamping force will effect a frictional force in an elongate direction of the armour wires 202, which will permanently hold the cable 200 in place within the hang-off device 1.

The clamps 40 are configured to only apply the clamping force on the cable 200 temporarily, since the cable 200 is now permanently held in place via its clamped armour wires 202. To do so, the bolts 17 are rotated in a counter-clockwise direction with respect to the main body 10, in order to also release the clamping force from the cable 200 and the temporary clamps 40.

Figure 10A:
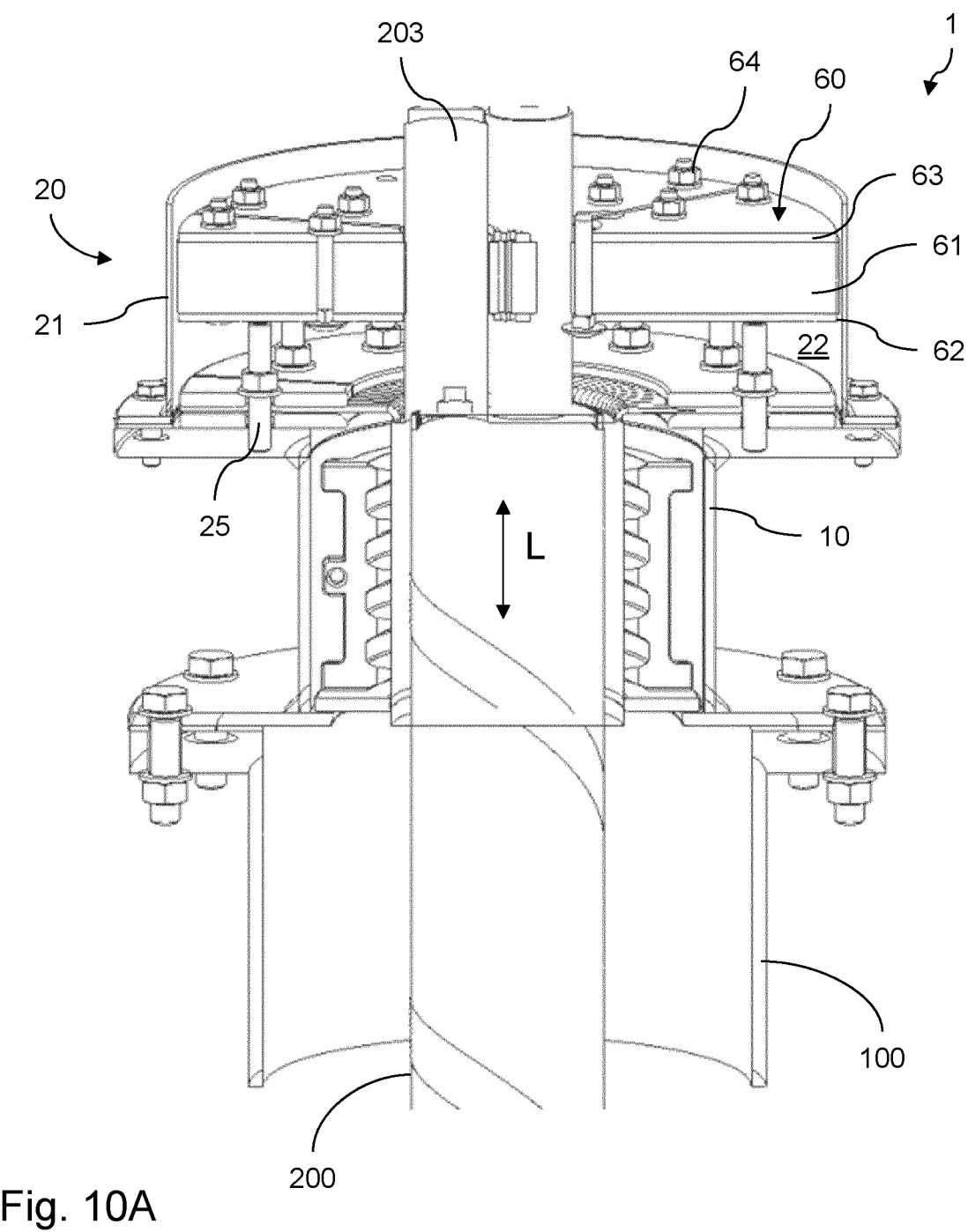

It is shown in FIG. 10A that, after the permanent clamping of the cable 200, a seal is made within the sealing passage 20. This seal is formed by three solid sealing elements 60, which are installed within the sealing passage 22. The solid sealing elements are inserted into the sealing passage 22 from above, e.g. from an upper head end opening in the cylindrical wall 21 of the sealing sleeve 20.

The three solid sealing elements 60 are configured to at least partially surround the three cable conductors 203 in the sealing passage 22 after being inserted therein. The solid sealing elements will, after insertion into the sealing sleeve 22, come to rest on the stud bolts 25 that are inserted in the second flange 14 of the main body 10.

All of the solid sealing elements 60 are, in combination, configured to form a transverse sealing wall in the sealing passage 22, which extends in a horizontal plane perpendicular to the longitudinal direction L. The combined solid sealing elements 60 have a shape that substantially corresponds to a cross-section of the cylindrical wall 21 of the sealing sleeve 20, wherein the perimeter of all combined solid sealing elements 60 substantially corresponds to the perimeter of the cylindrical wall 21 of the sealing sleeve 22, in order to form a substantially airtight seal between them.

Figure 10B:
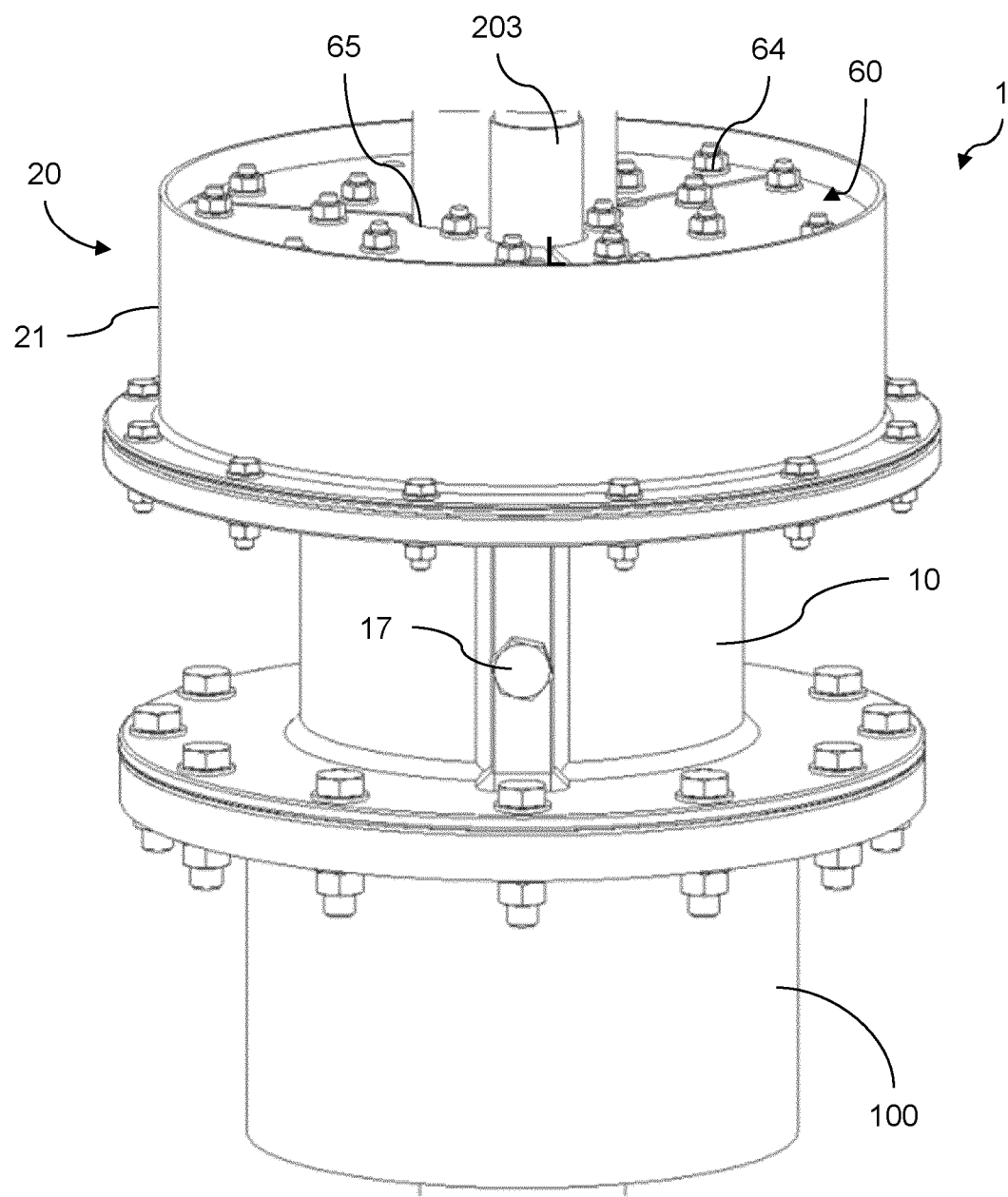

The solid sealing elements 60 each comprises a recess 65 at their portions that are configured to abut the cable conductors 203, as is best displayed in FIG. 10B, which shows a side view on the hang-off device of FIG. 10A. Each of the recesses 65 in the solid sealing elements 60 substantially corresponds to a cross-sectional shape of a cable conductor 203, such that an airtight seal is formed between the cable conductors 203 and the solid sealing elements 60 as well.

Each of the solid sealing elements 60 is configured to deform towards the cable conductors 203 and towards the sealing sleeve 20 upon installation. This deforming takes place in the horizontal plane, perpendicular to the longitudinal direction L. This deforming is beneficial for improving the quality of the seal that is established between the cable conductors 203 and the sealing sleeve 20.

Upon inserting the three solid sealing elements 60 in the sealing passage 22, each of them has a certain initial cross-section, seen in the longitudinal direction L. The combined initial cross-sections of all solid sealing elements 60 is somewhat smaller than the remaining cross-section of the sealing passage 22, e.g. the cross-section that is defined between the sealing wall 21 and the cable conductors 203. This smaller cross-section provides for more convenient inserting of the solid sealing elements 60, compared to when the solid sealing elements were to fit snugly.

Proper airtight sealing is not safeguarded yet, in this initial state. To improve the sealing after inserting of the solid sealing elements 60, the solid sealing elements 60 are deformed towards the cable conductors 203 and the sealing sleeve 20. This deforming towards a deformed state increases the cross-section of the respective solid sealing elements 60 towards a deformed cross-section that is larger than their initial cross-section. As a result, the deformed solid sealing elements 60 come to fit snugly and the combined deformed cross-sections of all solid sealing elements 60 is the same as the remaining cross-section of the sealing passage 22. Accordingly, the snugly fitted deformed solid sealing elements 60 will provide for an improved and airtight seal.

Each of the solid sealing elements comprises a deformable polyurethane material 61 and two rigid sealing plates 62, 63. In an installed configuration, the two rigid sealing plates 62, 63 are disposed in a horizontal plane perpendicular to the longitudinal direction L.

The polyurethane material 61 is arranged in between the rigid sealing plates 62, 63 and also extends in the horizontal plane. A sandwich-like solid sealing element 60 is obtained, which comprises the polyurethane material 61 that is covered between a lower rigid sealing plate 62 and an upper rigid sealing plate 63.

The polyurethane material 61 is configured to laterally deform upon clamping the rigid sealing plates 62, 63 towards each other in the longitudinal direction L. The deformation of the polyurethane material 61 is elastic and the clamping of the rigid sealing plates 62, 63 in the longitudinal direction L will effect a compression of the polyurethane material 61. As a result of the Poisson-type elastic deformation, the compression of the polyurethane material 61 in the longitudinal direction L will effect expansion of the polyurethane material 61 in the horizontal plane perpendicular to the longitudinal direction L. The expansion the polyurethane material 61 in the horizontal plane effects that the polyurethane material 61 will come in contact with the sealing wall 21 and the cable conductors 203 and that the polyurethane material 61 of each two adjacent solid sealing elements 60 will come in contact with each other.

Each of the solid sealing elements 60 comprises a plurality of bolts 64 for clamping the rigid sealing plates 62, 63 towards each other. The rigid sealing plates 62, 63 thereto each comprise a corresponding number of through holes aligned in the longitudinal direction L, through which the bolts 64 are inserted. The bolts 64 of a solid sealing element 60 are, upon fastening of a nut thereon, together configured to pull the upper rigid sealing plate 63 and the lower rigid sealing plate 62 towards each other in the longitudinal direction L.

Accordingly, the polyurethane material 61 in between the rigid sealing plates 62, 63 will expand in the horizontal plane.

The invention claimed is:

1. A method for holding a cable in a wind turbine transition piece by a cable hang-off device, the method comprising:
    providing a cable hang-off device comprising a main body with a first flange, an opposed second flange and a through passage, a sealing sleeve with a sealing passage, at least one temporary clamp, located in the through passage, a clamping plate, and at least one solid sealing element;
    attaching the main body to the wind turbine transition piece with the first flange;
    attaching the sealing sleeve to the second flange;
    inserting the cable through the through passage and the sealing passage sleeve;
    clamping an outer serving of the cable with the at least one temporary clamp;
    pealing the outer serving of the cable to reveal armour wires of the cable;
    folding the armour wires over the second flange in a radially outward direction, with respect to a longitudinal direction of the cable hang-off device;
    inserting the clamping plate in the sealing passage;
    clamping the armour wires against the second flange, by the clamping plate;
    releasing the at least one temporary clamp from outside the main body to release a clamping force from the at least one temporary clamp;
    inserting the at least one solid sealing element in the sealing passage to at least partially surround one or more conductors of the cable; and
    sealing the sealing passage with the at least one solid sealing element.

2. The method according to claim 1, wherein the clamping plate comprises multiple clamping plate segments, and
    wherein the inserting of the clamping plate comprises the inserting of the multiple clamping plate segments around the conductors of the cable.

3. The method according to claim 1, wherein the at least one solid sealing element comprises a deformable polyurethane material and two rigid sealing plates,
    wherein the polyurethane material is arranged in between the rigid sealing plates, and
    wherein the sealing of the sealing passage comprises the lateral deforming of the polyurethane material in a plane perpendicular to the longitudinal direction by clamping the rigid sealing plates towards each other in the longitudinal direction.

4. The method according to claim 3, wherein the cable hang-off device further comprises at least one solid sealing element including at least one fastener for clamping the rigid sealing plates towards each other.

5. The method according to claim 4, wherein the at least one fastener comprises at least one nut and bolt.

6. The method according to claim 1, wherein the sealing sleeve is a single-piece sealing sleeve.

7. The method according to claim 6, wherein the single-piece sealing sleeve comprises a circumferential sealing flange that is connected to a cylindrical wall, and
    wherein the single-piece sealing sleeve is attached to the second flange with the sealing flange thereof.

8. The method according to claim 1, wherein an inner diameter of the sealing passage is larger than an outer diameter of the clamping plate.

9. The method according to claim 7, wherein an inner diameter of the circumferential sealing flange is larger than an outer diameter of the clamping plate.

10. The method according to claim 1, wherein the cable hang-off device further comprises a support plate that, within the through passage, rests on the first flange in order to form a support for the at least one temporary clamp.

11. The method according to claim 10, wherein the support plate comprises multiple support plate segments, which are each inserted in the through passage to form the support plate within the through passage.

12. The method according to claim 1, wherein the main body is a single-piece main body.

13. The method according to claim 1, wherein the at least one solid sealing element deforms towards the conductors of the cable and the sealing sleeve upon installation.

14. The method according to claim 1, wherein the at least one tensioner comprises a respective bolt for each of the at least one temporary clamps,
    wherein each bolt is associated with a corresponding nut in the main body, and
    wherein the bolts press their respective temporary clamp away from the main body, in a radially inward direction, with respect to the longitudinal direction.

* * * * *